United States Patent
Ogawa et al.

(10) Patent No.: US 11,740,629 B2
(45) Date of Patent: Aug. 29, 2023

(54) CONTROL DEVICE FOR AUTONOMOUS OPERATING MACHINES, CONTROL METHOD FOR AUTONOMOUS OPERATING MACHINES, AND RECORDING MEDIUM HAVING CONTROL PROGRAM FOR AUTONOMOUS OPERATING MACHINES STORED THEREON

(71) Applicant: NEC Corporation, Tokyo (JP)

(72) Inventors: Masatsugu Ogawa, Tokyo (JP); Masumi Ichien, Tokyo (JP); Masafumi Emura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 467 days.

(21) Appl. No.: 17/053,594

(22) PCT Filed: May 9, 2018

(86) PCT No.: PCT/JP2018/017914
§ 371 (c)(1),
(2) Date: Nov. 6, 2020

(87) PCT Pub. No.: WO2019/215838
PCT Pub. Date: Nov. 14, 2019

(65) Prior Publication Data
US 2021/0232139 A1     Jul. 29, 2021

(51) Int. Cl.
*G05D 1/00* (2006.01)
*G05D 1/10* (2006.01)

(52) U.S. Cl.
CPC ......... *G05D 1/0088* (2013.01); *G05D 1/0061* (2013.01); *G05D 1/104* (2013.01); *G05D 1/0011* (2013.01); *G05D 1/101* (2013.01)

(58) Field of Classification Search
CPC .. G05D 1/0088; G05D 1/0061; G05D 1/0011; G05D 1/101; G05D 1/12; G05D 1/104
See application file for complete search history.

(56) References Cited

U.S. PATENT DOCUMENTS

2006/0015215 A1*  1/2006  Howard ............... G05D 1/0088
                                                         701/469
2015/0148951 A1    5/2015  Jeon et al.
(Continued)

FOREIGN PATENT DOCUMENTS

JP    2009-199359 A    9/2009
JP    5559671 B2       7/2014
(Continued)

OTHER PUBLICATIONS

Jin et al.; Balancing Search and Target Response in Cooperative Unmanned Aerial Vehicle (UAV) Teams; IEEE Transactions on Systems, Man, and Cybernetics—Part B: Cybernetics, vol. 36, No. 3, Jun. 2006; pp. 571-587 (Year: 2006).*
(Continued)

*Primary Examiner* — Michael J Zanelli
(74) *Attorney, Agent, or Firm* — Sughrue Mion, PLLC

(57) ABSTRACT

A control device for an autonomous operating machine includes: an acquisition unit that acquires first state information of a first autonomous operating machine and second state information of a second autonomous operating machine in a case where the first and the second autonomous operating machines that operate in cooperation with each other select and execute executable operations as needed in order to achieve an object; a generation unit that generates value information indicating a height of a value of execution for achievement of the object regarding each of the operations that can be executed by the first autonomous operating machine by using a value calculation criterion based on the first state information and the second state information; a selection unit that selects a specific operation from among the operations based on the value information; and a control that controls the first autonomous operating machine to execute the specific operation.

16 Claims, 12 Drawing Sheets

(56) References Cited

U.S. PATENT DOCUMENTS

| | | |
|---|---|---|
| 2018/0001476 A1* | 1/2018 | Tan .................. B61G 7/04 |
| 2018/0059659 A1 | 3/2018 | Takeuchi et al. |
| 2018/0074516 A1 | 3/2018 | Ogawa et al. |
| 2019/0176968 A1 | 6/2019 | Ogawa |

FOREIGN PATENT DOCUMENTS

| | | | |
|---|---|---|---|
| JP | 2015-201068 A | 11/2015 | |
| JP | 2017-059217 A | 3/2017 | |
| JP | 2017-142659 A | 8/2017 | |
| JP | 2017-188066 A | 10/2017 | |
| JP | 2018-030407 A | 3/2018 | |
| WO | WO-2007080584 A2 * | 7/2007 | ........... G05D 1/0088 |
| WO | 2016/166983 A1 | 10/2016 | |
| WO | 2017/221859 A1 | 12/2017 | |

OTHER PUBLICATIONS

Tisdale et al.; Autonomous UAV Path Planning and Estimation; IEEE Robotics & Automation Magazine; Jun. 2009; pp. 35-42 (Year: 2009).*

International Search Report for PCT Application No. PCT/JP2018/017914, dated Jul. 10, 2018.

English translation of Written opinion for PCT Application No. PCT/JP2018/017914, dated Jul. 10, 2018.

Japanese Office Action for JP Application No. 2020-517672 dated Nov. 2, 2021 with English Translation.

* cited by examiner

CONTROL DEVICE FOR AUTONOMOUS OPERATING MACHINES, CONTROL METHOD FOR AUTONOMOUS OPERATING MACHINES, AND RECORDING MEDIUM HAVING CONTROL PROGRAM FOR AUTONOMOUS OPERATING MACHINES STORED THEREON

This application is a National Stage Entry of PCT/JP2018/017914 filed on May 9, 2018, the contents of all of which are incorporated herein by reference, in their entirety.

TECHNICAL FIELD

The present invention relates to a technology for controlling a plurality of autonomous operating machines in cooperation with each other in order to achieve an object.

BACKGROUND ART

Many application examples using unmanned aerial vehicles to achieve an object have been proposed. For example, a cleaning robot that automatically cleans a room, a flying unmanned aerial vehicle (drone) that captures an image from the air or performs delivery, or the like are exemplified. A robot that operates in dangerous environments such as nuclear power plants is also an example.

In the above application example or the like, a single unmanned aerial vehicle is usually used. However, an application example using the plurality of unmanned aerial vehicles is also proposed. For example, an application example in which goods ordered by customers are quickly collected by using a plurality of robots that carries packages in an e-commerce factory, an application example in which a search target is searched by using the plurality of unmanned aerial vehicles, and the like are known.

In particular, the application example in which the search target is searched by the plurality of unmanned aerial vehicles has been intensively studied in recent years as a defense-related technology. The unmanned aerial vehicle used in such an application example is generally referred to as an Unmanned x Vehicle (UxV). For example, an unmanned aircraft is referred to as an Unmanned Air Vehicle (UAV), an unmanned ship is referred to as an Unmanned Surface Vehicle (USV), and an unmanned undersea ship is referred to as an Unmanned Undersea Vehicle (UUV).

There are two types of unmanned aerial vehicles described above including an unmanned aerial vehicle that is remotely operated by an operator and an unmanned aerial vehicle that autonomously operates by a program mounted thereon. Then, the technology regarding these unmanned aerial vehicles advances in a direction of the autonomous operation by the programs as possible. This is because an unmanned aerial vehicle or an unmanned aerial vehicle group that can shoulder various actions, labors, or the like instead of humans in an environment where no human exists is desired. In recent years, as it is found from active study of artificial intelligence according to expectations such that the unmanned aerial vehicle can autonomously and intelligently operate by mounting excellent artificial intelligence, there has been a growing expectation to a technology relating to autonomous control of the unmanned aerial vehicle.

As the technology related to such a technology, PTL 1 discloses a movement control method that makes each of a plurality of autonomous mobile robots efficiently execute tasks. In this method, a first autonomous mobile robot calculates a first confidence factor indicating a degree of certainty that a current position of the first autonomous mobile robot is a position suitable for executing a task. In this method, the first autonomous mobile robot receives a second confidence factor indicating a degree of certainty that a current position of a second autonomous mobile robot is a position suitable for executing a task from the second autonomous mobile robot. In this method, the first autonomous mobile robot calculates a movement vector to which the first autonomous mobile robot needs to be moved on the basis of the first confidence factor, the second confidence factor, and the current position of the second autonomous mobile robot. Then, in this method, the first autonomous mobile robot controls movement of the first autonomous mobile robot on the basis of the movement vector.

PTL 2 discloses an autonomous mobile body system that can continue to maintain high reliability of a plurality of mobile bodies as a whole. This system includes the plurality of mobile bodies that measures their positions by sensors and autonomously moves to a desired destination. This system acquires sensor information, estimates the position of the mobile body on the basis of the acquired sensor information, calculates reliability of the position, and transmits holding information held by the system between the mobile bodies. This system records the reliability, the position, and an identifier that is used to identify the mobile body in association with each other and selects a mobile body that is caused to perform a reliability recovery action. Then, this system controls the selected mobile body to move to a position with high reliability.

PTL 3 discloses a mobile body that operates in cooperation with another mobile body. This mobile body generates first control information that makes the mobile body operate alone. This mobile body acquires states of the mobile body and the other mobile body. This mobile body generates second control information that makes the mobile body operate in cooperation with the other mobile body on the basis of the acquired states. Then, this mobile body generates third control information on the basis of the first control information and the second control information and controls the operation of the mobile body in accordance with the third control information.

PTL 4 discloses a method of assisting traveling control that obtains an effect of shortening an alarm time without lowering safety and without incurring costs. In this method, an on-board device on a train that approaches a railroad crossing transmits position and speed information of the train to a railroad crossing control device at predetermined intervals. The railroad crossing control device calculates a railroad crossing reaching prediction time and a brake pattern reaching prediction time on the basis of the position and the speed of the train received from the on-board device. The railroad crossing control device compares a designed alarm time that has been previously stored with the railroad crossing reaching prediction time to be calculated and compares a railroad crossing closing completion time that has been previously stored with a railroad crossing closing completion time to be calculated, and then, performs control to start an alarm in a case where the comparison result satisfies a predetermined condition. The railroad crossing control device calculates a traveling control pattern that accelerates the train after the start of the alarm and transmits the calculated pattern to the on-board device. The on-board device presents the calculated traveling control pattern to a crew and assists traveling control by the crew.

CITATION LIST

Patent Literature

[PTL 1] JP 2017-059217 A
[PTL 2] JP 2017-188066 A
[PTL 3] WO 2017/221859
[PTL 4] JP 5559671 B1

SUMMARY OF INVENTION

Technical Problem

An intelligent operation of the unmanned aerial vehicle (autonomous operating machine) that autonomously operates means that the unmanned aerial vehicle autonomously changes the operation according to a situation. In general, in order to achieve an object, the unmanned aerial vehicle needs to execute a plurality of operations (mission) and change the operation according to the situation. For example, the unmanned aerial vehicle for defense searches for a dangerous object first, tracks the dangerous object in a case of finding the dangerous object (in a case where dangerous object moves), and finally captures the dangerous object in some cases. In this way, the unmanned aerial vehicle needs to change the operation (searching, tracking, and capturing in above example) according to the situation. In many current systems, an operator often switches the operations by remote operations. However, in the future, it is desired for the unmanned aerial vehicle to autonomously determine and automatically switch the operations.

Regarding the switching of the operations, it is not very difficult for a single unmanned aerial vehicle to switch the operations, for example, in an order of "searching—tracking—capturing" on the basis of a state transition diagram. However, in a case of the plurality of unmanned aerial vehicles (unmanned aerial vehicle group) that operates in cooperation (cooperation) with each other, because switching of the operations of the respective unmanned aerial vehicles are required to match (that is, total optimization), from viewpoint as an entire unmanned aerial vehicle group, in order to achieve the object, it is significantly difficult to determine the switching of the operations of the plurality of unmanned aerial vehicles.

For example, simple determination such that an unmanned aerial vehicle tracks the dangerous object because the unmanned aerial vehicle is close to the dangerous object is insufficient. This is because, in a case where another unmanned aerial vehicle is closer to the dangerous object than the above unmanned aerial vehicle, it is more efficient that the other unmanned aerial vehicle tracks the dangerous object. Moreover, in a case where the plurality of unmanned aerial vehicles among the unmanned aerial vehicle group performs tracking, it cannot be said that determination regarding which operation the unmanned aerial vehicle needs to perform is made in association with a simple IF-THEN rule using the state transition diagram or the like is optimum. Therefore, in order to achieve the object as the unmanned aerial vehicle group, it is difficult for each unmanned aerial vehicle to optimally (efficiently) switch the operations. It cannot be said that the technologies described in PTLs 1 to 4 are sufficient to solve this problem. A main object of the present invention is to provide a control device for an autonomous operating machine or the like that solves this problem.

Solution to Problem

A control device for an autonomous operating machine according to one mode of the present invention includes acquisition means for acquiring first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object, generation means for generating value information indicating a height of a value of execution for achievement of the object regarding each of the plurality of operations that can be executed by the first autonomous operating machine by using a value calculation criterion based on the first state information and the second state information, selection means for selecting a specific operation from among the plurality of operations based on the value information regarding each of the plurality of operations, and control means for controlling the first autonomous operating machine to execute the specific operation.

A control method for an autonomous operating machine according to one mode of the present invention performed by an information processing apparatus, in another aspect for achieving the object, includes acquiring first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object, generating value information indicating a height of a value of execution for achievement of the object regarding each of the plurality of operations that can be executed by the first autonomous operating machine by using a value calculation criterion based on the first state information and the second state information, selecting a specific operation from among the plurality of operations based on the value information regarding each of the plurality of operations, and controlling the first autonomous operating machine to execute the specific operation.

A control program for an autonomous operating machine according to one mode of the present invention, in still another aspect for achieving the object, is a program for causing a computer to execute processing including acquisition processing of acquiring first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object, generation processing of generating value information indicating a height of a value of execution for achievement of the object regarding each of the plurality of operations that can be executed by the first autonomous operating machine by using a value calculation criterion based on the first state information and the second state information, selection processing of selecting a specific operation from among the plurality of operations based on the value information regarding each of the plurality of operations, and control processing of controlling the first autonomous operating machine to execute the specific operation.

Moreover, the present invention can be achieved by a computer-readable nonvolatile recording medium that stores the control program (computer program) for the autonomous operating machine.

EXAMPLE EMBODIMENT

Hereinafter, example embodiments of the present invention are described in detail with reference to the drawings.

First Example Embodiment

Figure 1:
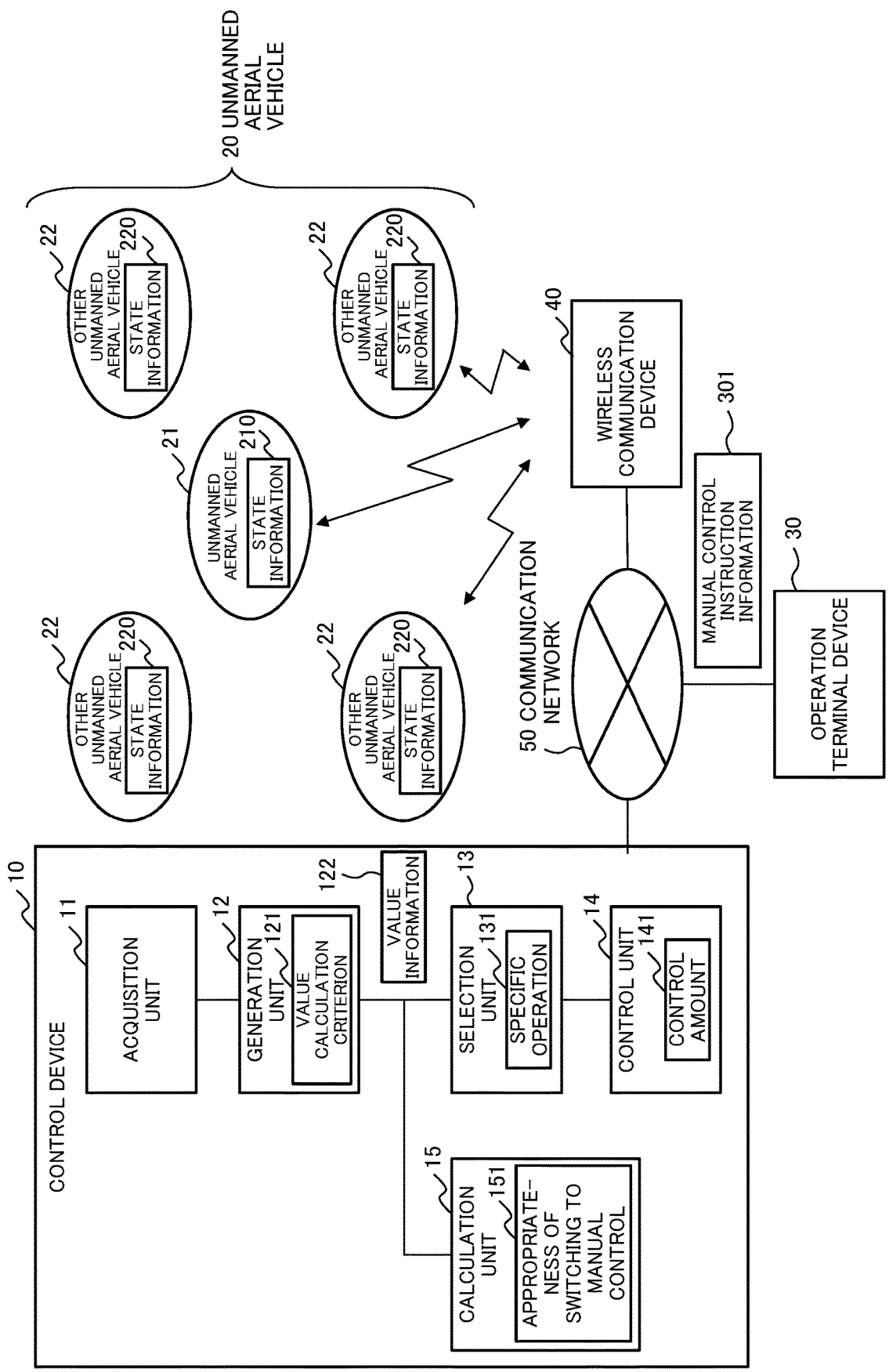
FIG. 1 is a block diagram illustrating a configuration of a control device 10 according to a first example embodiment of the present invention.

FIG. 1 is a block diagram conceptually illustrating a configuration of a control device 10 according to a first example embodiment of the present invention. The control device 10 is an information processing apparatus that controls a plurality of unmanned aerial vehicles 20 (autonomous operating machine) that can autonomously operate in cooperation (cooperation) with each other in order to achieve a predetermined object, for example, to search for, track, and capture a target such as a dangerous object. The unmanned aerial vehicle 20 is an UAV, for example, a drone that selects and executes any one of the operations, for example, searching, tracking, and capturing as needed in order to achieve the object.

The control device 10 according to the present example embodiment controls the plurality of unmanned aerial vehicles 20 in parallel. As described later, when controlling a certain unmanned aerial vehicle 20, the control device 10 performs control based on a state of one or more of other unmanned aerial vehicles 20 different from the unmanned aerial vehicle 20. Therefore, in the description of the present example embodiment, as illustrated in FIG. 1, the unmanned aerial vehicles 20 are distinguished into an unmanned aerial vehicle 21 (first autonomous operating machine) to be controlled and another unmanned aerial vehicle 22 (second autonomous operating machine) different from the unmanned aerial vehicle 21 whose state is referred when controlling the unmanned aerial vehicle 21.

Each of the unmanned aerial vehicles 20 (unmanned aerial vehicle 21 and other unmanned aerial vehicle 22) includes a sensor that can measure the state thereof. By including, for example, a Global Navigation Satellite System (GNSS) sensor or the like, the unmanned aerial vehicle 21 and the other unmanned aerial vehicle 22 respectively acquire positions of the unmanned aerial vehicle, as state information 210 (first state information) and state information 220 (second state information), as one of the states of the unmanned aerial vehicles. Alternatively, the state information 210 and the state information 220 may include, for example, information indicating a moving speed of the vehicle, information indicating an operation setting value of the vehicle, information indicating a state of a battery mounted on the vehicle, information indicating a failure occurrence status of the vehicle, or the like. Alternatively, the state information 210 and the state information 220 may include, for example, information indicating a position of a target whose position can be confirmed.

The unmanned aerial vehicle 21 and the other unmanned aerial vehicle 22 can communicate with a wireless communication device 40 and appropriately transmit the acquired state information 210 and state information 220 to the wireless communication device 40. The wireless communication device 40 is connected to a communication network 50, for example, the Internet or the like. The communication network 50 is also connected to the control device 10 and an operation terminal device 30. That is, because the control device 10 and the operation terminal device 30 can communicate with the wireless communication device 40 via the communication network 50, the control device 10 and the operation terminal device 30 can communicate with the unmanned aerial vehicle 20 via the wireless communication device 40. The operation terminal device 30 is an information processing apparatus, for example, a tablet terminal device or the like used when a control system of the unmanned aerial vehicle 21 is switched from an autonomous control system to a manual control system and an operator manually controls the unmanned aerial vehicle 21.

Figure 2:
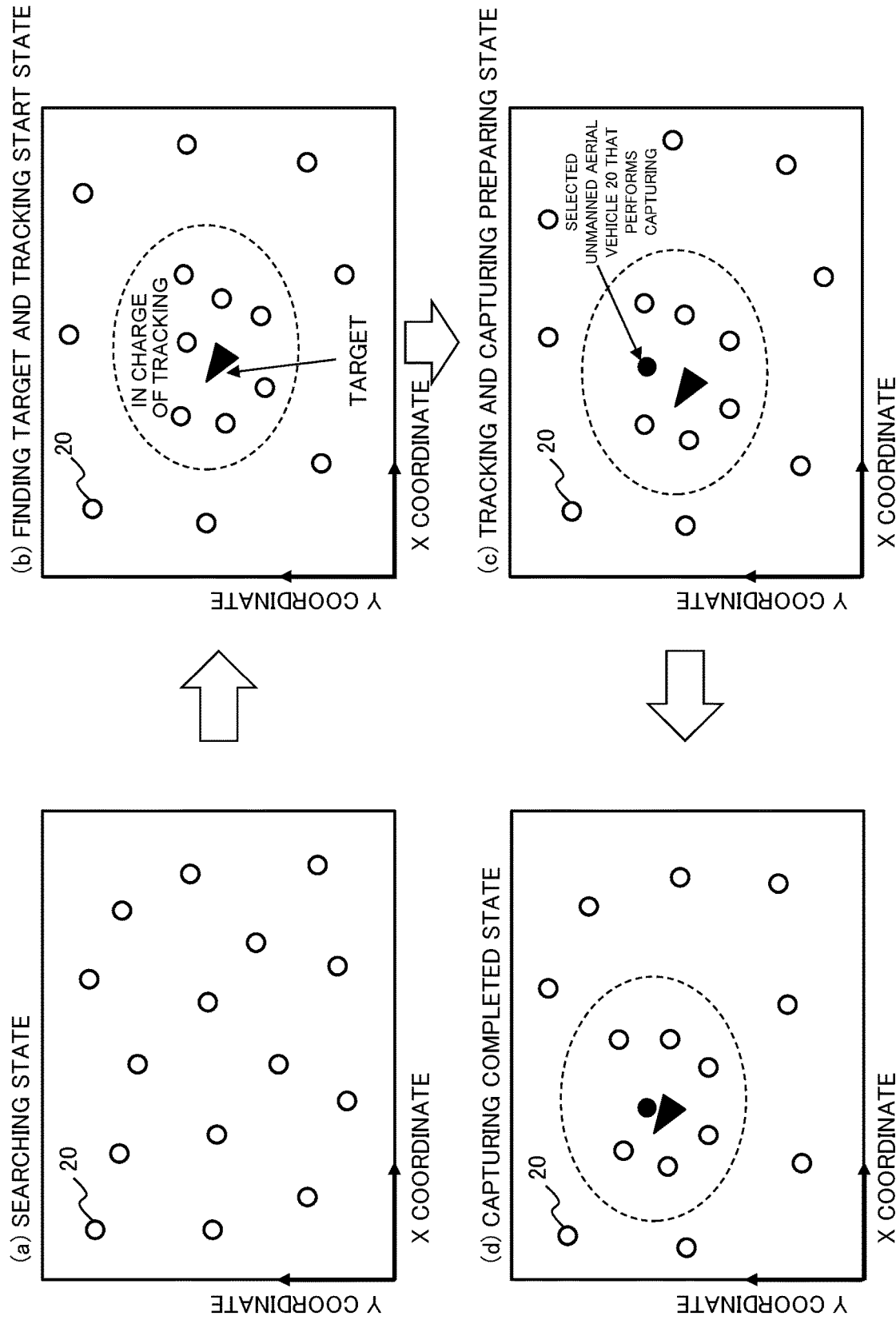
FIG. 2 is a diagram illustrating movements of a plurality of unmanned aerial vehicles 20, according to the first example embodiment of the present invention, for searching for, tracking, and capturing a target in cooperation with each other.

FIG. 2 is a diagram illustrating movements of the unmanned aerial vehicles 20, controlled by the control device 10, for searching, tracking, and capturing a target in cooperation (cooperation) with each other in a case where the plurality of unmanned aerial vehicles 20 according to the present example embodiment performs an operation in order to search, track, and capture the target such as a dangerous object. In FIG. 2, positions of the unmanned aerial vehicles 20 and the target are indicated by XY coordinates (two-dimensional coordinate).

FIG. 2(*a*) illustrates a searching state where the unmanned aerial vehicles 20 search for the target. In the searching state illustrated in FIG. 2(*a*), the individual unmanned aerial vehicles 20 are uniformly spread and search for the target. FIG. 2(*b*) illustrates a state where at least some of the unmanned aerial vehicles 20 (unmanned aerial vehicles 20 positioned in region surrounded by dotted line in FIG. 2(*b*)) start to track the target after the unmanned aerial vehicles 20 have found the target. The unmanned aerial vehicles 20 positioned outside the region surrounded by the dotted line in FIG. 2(*b*) continue the search operation as assuming, for example, that a plurality of targets exists.

FIG. 2(*c*) illustrates a state where a specific unmanned aerial vehicle 20, selected by the operator from among the unmanned aerial vehicles 20 that track the target, starts preparation for capturing the target (for example, put net on). Then, FIG. 2(*d*) illustrates a state where the specific unmanned aerial vehicle 20 has captured the target. As described later, the control device 10 according to the present example embodiment controls each of the unmanned aerial vehicles 20 to execute the operations illustrated in FIG. 2 for total optimization in order to achieve an object.

The control device 10 according to the present example embodiment is, for example, an information processing apparatus such as a server device constructed on a cloud side in cloud computing and controls the unmanned aerial vehicle 20 by communicating with the unmanned aerial vehicle 20 via the communication network 50 and the wireless communication device 40. As illustrated in FIG. 1, the control device 10 includes an acquisition unit 11, a generation unit 12, a selection unit 13, a control unit 14, and a calculation unit 15.

The acquisition unit 11 acquires the state information 210 and the state information 220 respectively from the unmanned aerial vehicle 21 and the other unmanned aerial vehicle 22 via the communication network 50 and the wireless communication device 40. Because the plurality of unmanned aerial vehicles 20 usually operates asynchronously with each other, timings of acquiring the state information 210 and the state information 220 by the acquisition unit 11 are usually asynchronous.

According to the state information 210 and the state information 220 acquired by the acquisition unit 11, the generation unit 12 generates value information 122, indicating a height of a value of execution of each of a plurality of operations that can be executed by the unmanned aerial vehicle 21 in order to achieve the object, by using a value calculation criterion 121. However, the plurality of operations that can be executed by the unmanned aerial vehicle 21 is, for example, searching for, tracking, capturing, or the like of the target such as the dangerous object. The plurality of operations that can be executed by the unmanned aerial vehicle 21 may be, for example, equal to or more than four types of operations obtained by dividing each of the operations including searching, tracking, and capturing with more fine grain size. It is assumed that the value calculation criterion 121 be given by an administrator of the control device 10 or the like in advance and be stored in a storage device (not illustrated), for example, an electronic memory, a magnetic disk, or the like included in the control device 10.

The height of the value of the execution for the achievement of the object is, for example, an index based on a height of a possibility of achieving the object by executing a certain operation. That is, the height of the value of the execution for the achievement of the object is, for example, an index based on a height of a possibility of finding the target in a case of the search operation and is, for example, an index based on a height of a possibility of being able to gradually approach the target without missing the found target in a case of the tracking operation.

Next, the value calculation criterion 121 is described. The value calculation criterion 121 includes, for example, an evaluation function A(N) (first evaluation function) based on the state information 210 and an evaluation function B(N) (second evaluation function) based on the state information 220 regarding each of the plurality of operations that can be executed by the unmanned aerial vehicle 21. However, the reference N is an identifier (operation number) with which each of the plurality of operations (for example, searching, tracking, capturing, or the like) can be identified.

More specifically, the evaluation function A(N) indicates a height of a value of the execution for the achievement of the object in a case where the unmanned aerial vehicle 21 in a state indicated by the state information 210 executes an operation N, and includes, for example, a control amount (operation amount) required for the unmanned aerial vehicle 21 to execute the operation N as a parameter variable. Similarly, the evaluation function B(N) indicates a height of a value of the execution for the achievement of the object in a case where the other unmanned aerial vehicle 22 in a state indicated by the state information 220 executes the operation N, and includes, for example, a control amount (operation amount) required for the other unmanned aerial vehicle 22 to execute the operation N as a parameter variable. Specific examples (details) of the evaluation function A(N) and the evaluation function B(N) are described later.

Then, the value calculation criterion 121 includes an evaluation function F(N) used to obtain the value indicated by the value information 122, based on the evaluation function A(N) and the evaluation function B(N). The evaluation function F(N) is, for example, a function indicating a difference between the evaluation function A(N) and the evaluation function B(N). That is, in this case, the evaluation function F(N) indicates a magnitude relationship between the height of the value of the execution of the operation N by the unmanned aerial vehicle 21 and the height of the value of the execution of the operation N by the other unmanned aerial vehicle 22.

Alternatively, the evaluation function F(N) may be a function indicating a difference between an evaluation function A'(N) and an evaluation function B'(N) obtained by differentiating the evaluation function A(N) and the evaluation function B(N) by the parameter variable that is included in the evaluation function A(N) and the evaluation function B(N) and indicates the control amount. In this case, each of the evaluation function A'(N) and the evaluation function B'(N) indicates a change amount (increment) of the height of the value of the execution for the achievement of the object per unit control amount. The evaluation function F(N) can more accurately obtain the value indicated by the value information 122 by using the evaluation function obtained by differentiating the evaluation function A(N) and the evaluation function B(N).

A specific example is described with reference to FIGS. 3 to 6 in which the generation unit 12 according to the present example embodiment generates the value information 122 by using the evaluation function A'(N), the evaluation function B'(N), and the evaluation function F(N) indicated by the value calculation criterion 121.

In the examples illustrated in FIGS. 3 to 6, the control device 10 illustrated in FIG. 1 controls at least four unmanned aerial vehicles 20, and the four unmanned aerial vehicles 20 are respectively indicated as unmanned aerial vehicles 20-0 to 20-3. Then, in the examples illustrated in FIGS. 3 to 6, when the unmanned aerial vehicles 20-0 to 20-3 shift from the searching state illustrated in FIG. 2(a) to a target finding and tracking start state illustrated in FIG. 2(b), the control device 10 controls the each of the unmanned aerial vehicles 20-0 to 20-3 to continue the searching operation or start the target tracking operation.

Figure 3:
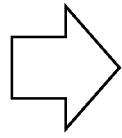
FIG. 3 is a diagram illustrating an example of calculating a value indicated by value information 122 by a generation unit 12 in a case where the control device 10 according to the first example embodiment of the present invention controls an unmanned aerial vehicle 20-0 as an unmanned aerial vehicle 21 to be controlled.

FIG. 3 is a diagram illustrating an example of calculating a value indicated by the value information 122 by the generation unit 12 in a case where the control device 10 controls the unmanned aerial vehicle 20-0 as the unmanned aerial vehicle 21 illustrated in FIG. 1 (that is, unmanned aerial vehicles 20-1 to 20-3 serve as other unmanned aerial vehicles 22 illustrated in FIG. 1). In this case, an evaluation function regarding the unmanned aerial vehicle 20-0 is set to A(N), and evaluation functions regarding the unmanned aerial vehicles 20-1 to 20-3 are respectively set to B1(N) to B3(N) in order.

In the example illustrated in FIG. 3, an operation of which N is "1" (operation 1) is set as searching, and an operation of which N is "2" (operation 2) is set as tracking. In a case where the unmanned aerial vehicles 20-0 to 20-3 continue the search operation (operation 1), the same operation is continued. Therefore, values of A'(1) and B1'(1) to B3'(1) are small values of "1" (increment of value of execution for achievement of object is small). On the other hand, in a case where the unmanned aerial vehicles 20-0 to 20-3 start the tracking operation (operation 2) to the target, values of A'(2) and B1'(2) to B3'(2) are respectively set to "10", "3", "5", and "20", in this order, that are larger than the values of A'(1) and B1'(1) to B3'(1). This is because, when the operations executed by the unmanned aerial vehicle 20-1 to 20-3 shift to a new stage from searching to tracking, the increment of the value of the execution for the achievement of the object is assumed to be higher than that in a case where the search operation is continued.

In the example illustrated in FIG. 3, the values of A'(2) and B1'(2) to B3'(2) are different from each other because positional relationships between the unmanned aerial vehicles 20-0 to 20-3 and the target are different from each other. That is, because the unmanned aerial vehicle 20 positioned at a place closer to the target is considered to have a higher increment of the value of executing the tracking operation, a value indicated by the evaluation function (differentiated function) of the above unmanned aerial vehicle 20 is larger. For example, in the example illustrated in FIG. 3, the values of A'(2) (value thereof is "10") and B3'(2) (value thereof is "20") are larger than the values of B1'(2) (value thereof is "3") and B2'(2) (value thereof is "5"). This indicates that the unmanned aerial vehicles 20-0 and 20-3 are positioned at places closer to the target than the unmanned aerial vehicles 20-1 and 20-2.

In the example illustrated in FIG. 3, the evaluation function F(N) used to obtain the value indicated by the value information 122 is defined as "A'(N)−B1'(N)+A'(N)−B2'(N)+A'(N)−B3'(N)". That is, the evaluation function F(N) indicates a sum of differences between the value indicated by the evaluation function (differentiated function) regarding the unmanned aerial vehicle 21 illustrated in FIG. 1 and the values of the evaluation functions (differentiated function) regarding the one or more other unmanned aerial vehicles 22. Therefore, the evaluation function F(N) becomes larger as the value indicated by the evaluation function (differentiated function) regarding the unmanned aerial vehicle 21 is relatively larger than the values indicated by the evaluation functions (differentiated function) regarding the one or more other unmanned aerial vehicles 22. Thus, the evaluation function F(N) indicates a relative height of the execution of the operation N by the unmanned aerial vehicle 21 regarding the increment of the height of the value of the execution for the achievement of the object in comparison with the execution of the operation N by the one or more other unmanned aerial vehicle 22.

In the example illustrated in FIG. 3, the generation unit 12 calculates F(0) as "0" and F(1) as "2" on the basis of the calculation formula of the evaluation function F(N).

Figure 4:
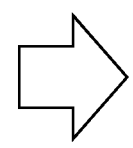
FIG. 4 is a diagram illustrating an example of calculating a value indicated by the value information 122 by the generation unit 12 in a case where the control device 10 according to the first example embodiment of the present invention controls an unmanned aerial vehicle 20-1 as an unmanned aerial vehicle 21.

FIG. 4 is a diagram illustrating an example of calculating a value indicated by the value information 122 by the generation unit 12 in a case where the control device 10 controls the unmanned aerial vehicle 20-1 as the unmanned aerial vehicle 21 illustrated in FIG. 1 (that is, unmanned aerial vehicles 20-0, 20-2, and 20-3 serve as other unmanned aerial vehicles 22 illustrated in FIG. 1). In this case, the evaluation function regarding the unmanned aerial vehicle 20-1 is set to A(N), and the evaluation functions regarding the unmanned aerial vehicles 20-0, 20-2, and 20-3 are respectively set to B0(N), B2(N), and B3(N) in order.

In the example illustrated in FIG. 4, because the evaluation function F(N) used to obtain the value indicated by the value information 122 is defined as "A'(N)−B0'(N)+A'(N)−B2'(N)+A'(N)−B3'(N)", the generation unit 12 calculates F(0) as "0" and F(1) as "−26" on the basis of the calculation formula of the evaluation function F(N).

Figure 5:
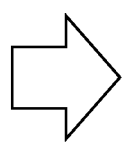
FIG. 5 is a diagram illustrating an example of calculating a value indicated by the value information 122 by the generation unit 12 in a case where the control device 10 according to the first example embodiment of the present invention controls an unmanned aerial vehicle 20-2 as an unmanned aerial vehicle 21.

FIG. 5 is a diagram illustrating an example of calculating a value indicated by the value information 122 by the generation unit 12 in a case where the control device 10 controls the unmanned aerial vehicle 20-2 as the unmanned aerial vehicle 21 illustrated in FIG. 1 (that is, unmanned aerial vehicles 20-0, 20-1, and 20-3 serve as other unmanned aerial vehicles 22 illustrated in FIG. 1). In this case, an evaluation function regarding the unmanned aerial vehicle 20-2 is set to A(N), and evaluation functions regarding the unmanned aerial vehicles 20-0, 20-1, and 20-3 are respectively set to B0(N), B1(N), and B3(N) in order.

In the example illustrated in FIG. 5, because the evaluation function F(N) for used to obtain the value indicated by the value information 122 is defined as "A'(N)−B0'(N)+A'(N)−B1'(N)+A'(N)−B3'(N)", the generation unit 12 calculates F(0) as "0" and F(1) as "−18" on the basis of the calculation formula of the evaluation function F(N).

Figure 6:
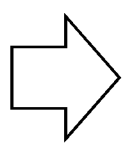
FIG. 6 is a diagram illustrating an example of calculating a value indicated by the value information 122 by the generation unit 12 in a case where the control device 10 according to the first example embodiment of the present invention controls an unmanned aerial vehicle 20-3 as an unmanned aerial vehicle 21.

FIG. 6 is a diagram illustrating an example of calculating a value indicated by the value information 122 by the generation unit 12 in a case where the control device 10 controls the unmanned aerial vehicle 20-3 as the unmanned aerial vehicle 21 illustrated in FIG. 1 (that is, unmanned aerial vehicles 20-0 to 20-2 serve as other unmanned aerial vehicles 22 illustrated in FIG. 1). In this case, an evaluation function regarding the unmanned aerial vehicle 20-3 is set to A(N), and evaluation functions regarding the unmanned aerial vehicles 20-0 to 20-2 are respectively set to B0 to B2(N) in order.

In the example illustrated in FIG. 6, because the evaluation function F(N) used to obtain the value indicated by the value information 122 is defined as "A'(N)−B0'(N)+A'(N)−B1'(N)+A'(N)−B2'(N)", the generation unit 12 calculates F(0) as "0" and F(1) as "42" on the basis of the calculation formula of the evaluation function F(N).

The generation unit 12 may weight the values indicated by the evaluation function A(N) and the evaluation function B(N) regarding each operation according to a predetermined criterion. Alternatively, in a case where a correlation or the like exists between a certain operation and another operation regarding a height of a value of execution of the certain operation, the generation unit 12 may execute the above processing by referring to an evaluation function regarding the other operation having the correlation or the like.

On the basis of the value information 122, regarding each of the plurality of operations that can be executed by the unmanned aerial vehicle 21, generated by the generation unit 12 as described above, the selection unit 13 illustrated in FIG. 1 selects a specific operation 131 from among the plurality of operations. For example, the selection unit 13 selects an operation in which the value indicated by the value information 122 satisfies a predetermined condition as the specific operation 131. The predetermined condition may be, for example, that the value indicated by the value information 122 is higher than a threshold or that the value indicated by the value information 122 is the highest.

For example, in the example illustrated in FIG. 3, because F(1) (value thereof is "2") is higher than "0" ("0" is threshold in present example embodiment) and is higher than F(0) (value thereof is "0"), the selection unit 13 selects "tracking" as the specific operation 131 for the unmanned aerial vehicle 20-0. For example, in the example illustrated in FIG. 4, because F(1) (value thereof is "−26") is lower than "0" and is lower than F(0) (value thereof is "0"), the selection unit 13 selects "searching" as the specific operation 131 for the unmanned aerial vehicle 20-1. For example, in the example illustrated in FIG. 5, because F(1) (value thereof is "−18") is lower than "0" and is lower than F(0) (value thereof is "0"), the selection unit 13 selects "searching" as the specific operation 131 for the unmanned aerial vehicle 20-2. For example, in the example illustrated in FIG. 6, because F(1) (value thereof is "42") is higher than "0" and is higher than F(0) (value thereof is "0"), the selection unit 13 selects "tracking" as the specific operation 131 for the unmanned aerial vehicle 20-3.

The control unit 14 illustrated in FIG. 1 controls the unmanned aerial vehicle 21 to execute the specific operation 131 selected by the selection unit 13. At this time, the control unit 14 calculates a control amount 141 regarding the specific operation 131 on the basis of the state information 210 (first state information) regarding the unmanned aerial vehicle 21 and the state information 220 (second state information) regarding the other unmanned aerial vehicle 22 and controls the unmanned aerial vehicle 21 to execute the specific operation 131 for a value indicated by the calculated control amount 141. When calculating the control amount 141 regarding the specific operation 131, the control unit 14 may, for example, refer to the evaluation function A(N) and the evaluation function B(N) described above. The control unit 14 sets an operation setting value of an actuator (movable unit) or the like that operates the unmanned aerial vehicle 21 on the basis of the calculated control amount 141 of the specific operation 131.

(Operation of Control Device 10 in a Case Where Control Device 10 Controls Unmanned Aerial Vehicle 20 by Switching Autonomous Control System And Manual Control System)

The control device 10 according to the present example embodiment can switch the control system with respect to the unmanned aerial vehicle 21 from the autonomous control system to the manual control system by the operator in response to a request from the operator. Next, an operation of the control device 10 in a case where the control device 10 controls the unmanned aerial vehicle 21 while switching the autonomous control system and the manual control system is described.

As illustrated in FIG. 1, the control device 10 receives manual control instruction information 301 from the operation terminal device 30 via the communication network 50. The manual control instruction information 301 is information generated by the operation terminal device 30 by inputting an operation to the operation terminal device 30 by the operator. The manual control instruction information 301 includes information that can identify the unmanned aerial vehicle 20 (unmanned aerial vehicle 21) of which the control system is desired to be switched from the autonomous control system to the manual control system (that is, manual control by operator is desired) and information indicating an operation instruction to the unmanned aerial vehicle 21 of which the control system is switched to the manual control system. Then, the information indicating the operation instruction to the unmanned aerial vehicle 21 of which the control system is switched to the manual control system includes, for example, information for instructing to prevent the unmanned aerial vehicle 21 from autonomously executing a certain operation.

In a case where the control device 10 receives the manual control instruction information 301, the selection unit 13 selects the specific operation 131 on the basis of the value information 122 and the manual control instruction information 301. In a case where the manual control instruction information 301 includes the information for instructing to prevent autonomous execution of a certain operation N, at least one of the generation unit 12 or the selection unit 13 sets the value indicated by the value information 122 regarding the operation N to be low.

Specifically, at least one of the generation unit 12 or the selection unit 13 can prevent autonomous control regarding the operation N, for example, by performing a predetermined calculation (for example, multiplying "0" or negative real number) with respect to the evaluation function A(N) or the evaluation function F(N) regarding the operation N. In this case, the unmanned aerial vehicle 21 of which the autonomous control regarding the operation N is prevented is removed from the unmanned aerial vehicle group including the plurality of unmanned aerial vehicles 20 regarding the operation N. Therefore, switching of the control system with respect to the unmanned aerial vehicle 21 from the autonomous control system to the manual control system does not have an influence that causes a problem on the entire unmanned aerial vehicle group.

In a case where the control system with respect to the unmanned aerial vehicle 21 is switched from the autonomous control system to the manual control system, the generation unit 12 may invalidate the evaluation function A(N) regarding the operation N executed by the unmanned aerial vehicle 21 in cooperation with the other unmanned aerial vehicle 22 (perform predetermined calculation on evaluation function A(N)). As a result, the unmanned aerial vehicle 21 of which the control system is switched to the manual control system is separated from the unmanned aerial vehicle group including the plurality of unmanned aerial vehicles 20.

The operations that can be executed by the unmanned aerial vehicle 21 include, for example, emergency operations such as a collision avoidance operation. The generation unit 12 may set a predetermined real number (for example, "1") indicating that the evaluation function is valid to the evaluation function A(N) without invalidating the evaluation function A(N) regarding the emergency operation N so that the unmanned aerial vehicle 21 can autonomously execute the emergency operation after the control system with respect to the unmanned aerial vehicle 21 is switched to the manual control system.

As described above, at least one of the generation unit 12 or the selection unit 13 may perform a calculation for recommending the operation N (for example, multiplying real number larger than "1"), in reverse to performing a calculation for preventing the operation N (for example, multiplying "0" or negative real number) on the value indicated by the value information 122 regarding the certain operation N. That is, at least one of the generation unit 12 or the selection unit 13 performs the calculation on the value indicated by the evaluation function A(N) or the evaluation function F(N) regarding the operation N on the basis of the manual control instruction information 301 including the information instructing to prevent or recommend the execution of the operation N so as to add a priority to the operation to be executed by the unmanned aerial vehicle 21.

In a case where the control device 10 receives the manual control instruction information 301, the control unit 14 calculates the control amount 141 regarding the specific operation 131 on the basis of the manual control instruction information 301 and controls the unmanned aerial vehicle 21 to execute the specific operation 131 for the value indicated by the calculated control amount 141.

The calculation unit 15 illustrated in FIG. 1 calculates the appropriateness 151 of the switching to the manual control, based on the magnitude of the effect on the achievement of the object caused by switching the system of controlling the unmanned aerial vehicle 21 from the autonomous control system to the manual control system, on the basis of the value information 122 (value indicated by evaluation function F(N)) generated by the generation unit 12. At this time, the calculation unit 15 calculates the appropriateness 151 of the switching to the manual control so that the value increases as the value indicated by the value information 122 decreases. For example, the calculation unit 15 may calculate a reciprocal of the value indicated by the evaluation function F(N) as the appropriateness 151 of the switching to the manual control.

The calculation unit 15 transmits the calculated appropriateness 151 of the switching to the manual control to the operation terminal device 30 via the communication network 50 in association with identification information that can identify the unmanned aerial vehicle 21. Thus, the calculation unit 15 displays the appropriateness 151 of the switching to the manual control, in association with the unmanned aerial vehicle 21, on a display screen included in the operation terminal device 30.

Figure 7:
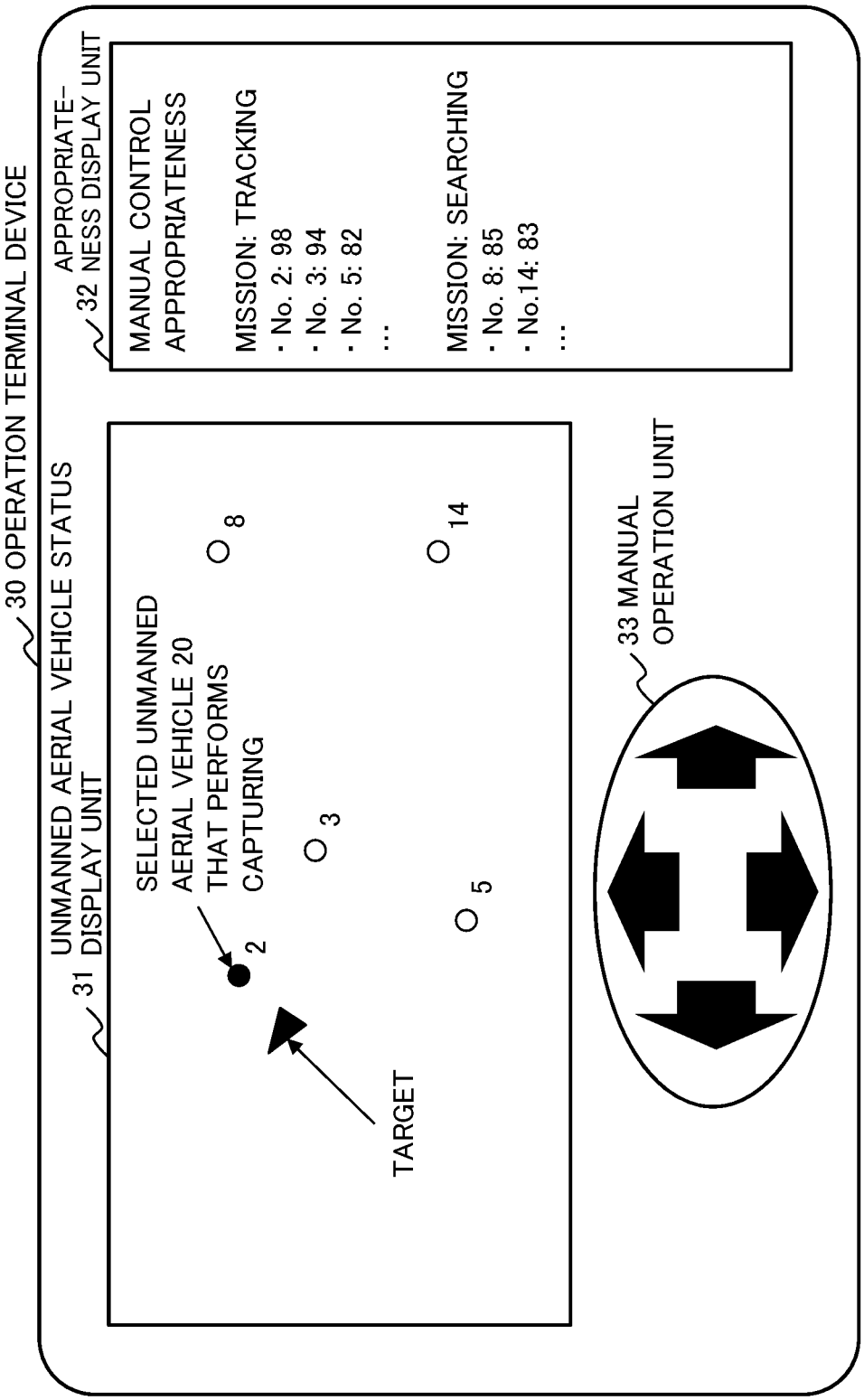
FIG. 7 is a diagram illustrating a mode of a user interface when the operator selects the unmanned aerial vehicle 20 that switches an autonomous control system to a manual control system by using an operation terminal device 30 according to the first example embodiment of the present invention.

FIG. 7 is a diagram illustrating a mode of a user interface when the operator selects the unmanned aerial vehicle 20 of which the control system is switched from the autonomous control system to the manual control system by using the operation terminal device 30 according to the present example embodiment. As illustrated in FIG. 7, the operation terminal device 30 includes an unmanned aerial vehicle status display unit 31, an appropriateness display unit 32, and a manual operation unit 33.

The unmanned aerial vehicle status display unit 31 displays positions of each unmanned aerial vehicle 20 and the target on the basis of the state information 210 and the state information 220 acquired from each unmanned aerial vehicle 20 or the control device 10 that has acquired the state information 210 and the state information 220 regarding each unmanned aerial vehicle 20 via the communication network 50. It is assumed that the information indicating the position of the target be included in at least one of the state information 210 or the state information 220 as a result of searching for the target by each unmanned aerial vehicle 20.

On the basis of the information transmitted from the calculation unit 15 as described above, the appropriateness display unit 32 displays the appropriateness 151 (manual control appropriateness) of the switching to the manual control regarding each unmanned aerial vehicle 20. In the example illustrated in FIG. 7, a manual control appropriateness of No. 2 unmanned aerial vehicle 20 among the unmanned aerial vehicles 20 that execute the tracking operation is "98" that is the highest.

In the present example embodiment, it is assumed that the unmanned aerial vehicle 20 that is manually controlled by the operator capture the target. In the example illustrated in FIG. 7, the operator selects the No. 2 unmanned aerial vehicle 20 having the highest manual control appropriateness as the unmanned aerial vehicle of which the autonomous control system is switched to the manual control system in order to capture the target. The selection operation is executed by operating the manual control unit 33 by the operator. Then, the unmanned aerial vehicle 20 of which the control system is switched to the manual control system executes an operation for capturing the target by the manual control by the operator via the manual operation unit 33.

In the present example embodiment, the number of the unmanned aerial vehicles 20 of which the control system is switched from the autonomous control system to the manual control system by the operator is one. However, the control systems of the plurality of unmanned aerial vehicles 20 may be switched from the autonomous control system to the manual control system. Alternatively, the plurality of operation terminal devices 30 may be connected to the communication network 50, and the plurality of unmanned aerial vehicles 20 may be manually controlled by the plurality of operators.

(Specific Example of Evaluation Function Used As Value Calculation Standard 121)

Next, a specific example of the evaluation function used by the control device 10 as the value calculation criterion 121 is described by using a case where the unmanned aerial vehicle 20 executes the search operation and the tracking operation to the target as an example.

In a case where the search operation and the tracking operation to the target are executed, according to the search theory, it is considered that the value calculation criterion 121 (evaluation function) can be expressed by an existence probability density of a target with respect to a place (function indicating existence probability density using place as variable) and a discovery probability of a target with respect to a search effort (function indicating discovery probability using search effort as variable). The search effort is a generic term of sources such as available (can be used) persons, objects, time, costs, and the like for searching and tracking activities, and, for example, the control amount (operation amount) described above can be assumed as one of the search efforts.

The existence probability density of the target at coordinates (x, y, z) in a three-dimensional space is expressed as Formula 1.

$$g(x,y,z,x_t,y_t,z_t) \quad \text{(Formula 1)}$$

However, in Formula 1, $(x_t, y_t, z_t)$ represents coordinates where the target is predicted to exist.

Figure 8:
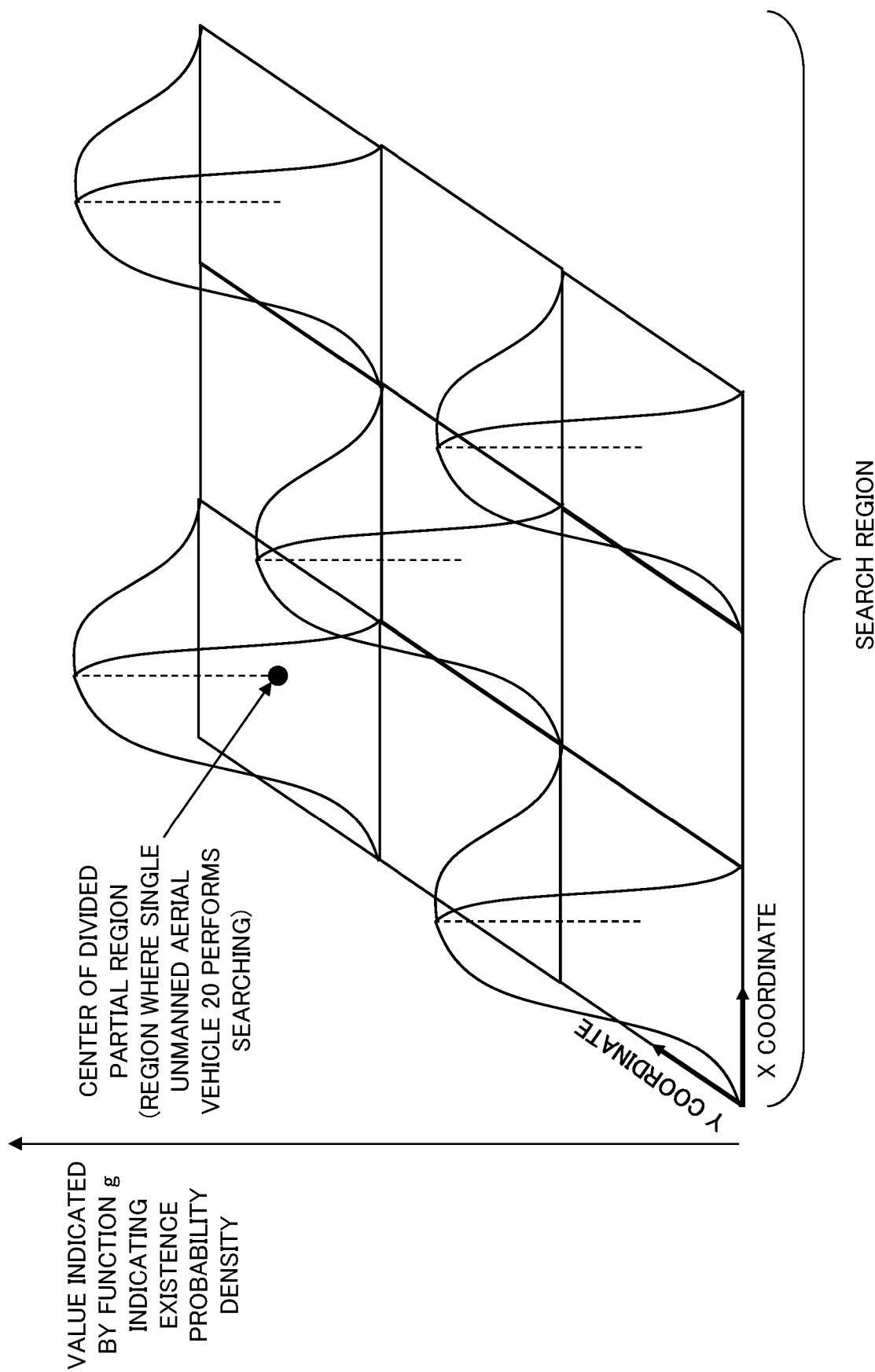
FIG. 8 is a diagram conceptually illustrating a distribution of values indicated by a function g indicating an existence probability density of the target in a case where the unmanned aerial vehicle 20 according to the first example embodiment of the present invention performs a search operation.

FIG. 8 is a diagram conceptually illustrating a distribution of values indicated by a function g indicating an existence probability density of a target in a case where the unmanned aerial vehicle 20 according to the present example embodiment executes a search operation. As illustrated in FIG. 8, the function g is, for example, a Gaussian function or the like that has characteristics in which a value is the largest at a center of a partial region for each of partial regions that are obtained by dividing a region where the unmanned aerial vehicle 20 executes the searching operation (search region) by the number of unmanned aerial vehicles 20 (that is, assumed that there is high possibility that target exists around center of partial region) and the value decreases as approaching a boundary of the partial region (that is, as separating from center of partial region). That is, in a case where the function g is graphed with respect to coordinates in the search region, the graph is expressed as a mountain for each partial region. In the graph illustrated in FIG. 8, for convenience of explanation, some mountains in the partial region are omitted.

FIG. 8 illustrates the graph of the function g with respect to the two-dimensional coordinates in the search region. However, it is sufficient that the function g with respect to three-dimensional coordinates in the search region be similarly considered (that is, has characteristics of which value becomes the largest at center of three-dimensional partial region and decreases as approaching boundary of partial region). Because the function g has the characteristics illustrated in FIG. 8, the plurality of unmanned aerial vehicles 20 can comprehensively and efficiently search the entire search region while sharing the search region.

Figure 9:
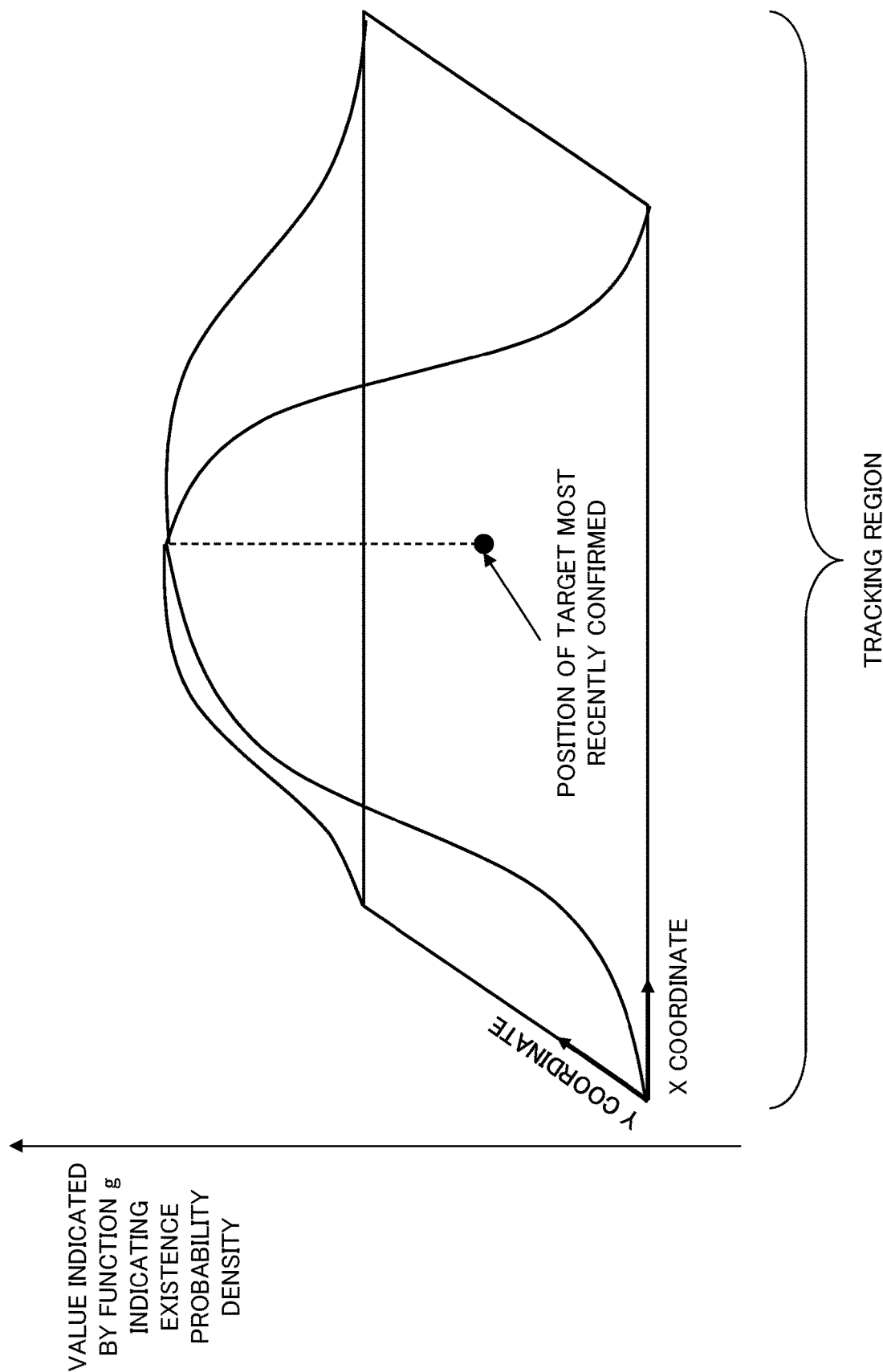
FIG. 9 is a diagram conceptually illustrating a distribution of values indicated by the function g indicating the existence probability density of the target in a case where the unmanned aerial vehicle 20 according to the first example embodiment of the present invention performs a tracking operation.

FIG. 9 is a diagram conceptually illustrating a distribution of the values indicated by the function g indicating the existence probability density of the target in a case where the unmanned aerial vehicle 20 according to the present example embodiment executes the tracking operation. As illustrated in FIG. 9, the function g is, for example, a Gaussian function that has characteristics of which a value becomes the largest at a position of the target most recently confirmed and decreases as separating from the position of the target most recently confirmed. That is, in a case where the function g is graphed with respect to the coordinates in a tracking region, the graph is expressed as a mountain having the position of the target most recently confirmed as a peak.

Because the function g has the characteristics illustrated in FIG. 9, the unmanned aerial vehicle 20 can efficiently track the target. The unmanned aerial vehicle 20 that has not been able to obtain the information indicating the position of the target can obtain the information indicating the position of the target from the control device 10.

Alternatively, the unmanned aerial vehicle 20 that has not been able to obtain the information indicating the position of the target may obtain the information indicating the position of the target by performing ad hoc communication with the unmanned aerial vehicle 20 that obtains the information indicating the position of the target. In order to improve accuracy of the existence probability density indicated by the function g, the function g may have characteristics of which a value becomes the largest at a position of the target that is predicted on the basis of the position of the target most recently confirmed and a movement of the target (direction, speed, or the like).

The discovery probability of the target with respect to the search effort is expressed as Formula 2.

$$p_i(\psi_i) \quad \text{(Formula 2)}$$

However, in Formula 2, $\psi_i$ represents a search effort given to an unmanned aerial vehicle 20-$i$ (i is any natural number). However, the reference i represents an identifier applied to each unmanned aerial vehicle 20, and an unmanned aerial vehicle 20 to which the identifier i is applied is referred to as the unmanned aerial vehicle 20-$i$.

The discovery probability of the target usually depends on an environment where the unmanned aerial vehicle 20 exists. For example, it is known that a discovery probability $p_i(\psi_i)$ in a case where the unmanned aerial vehicle 20-$i$ searches the sea for the target by using a sonar is expressed as Formula 3.

$$p_i(\psi_i)=1-e^{-\gamma_i \psi_i} \quad \text{(Formula 3)}$$

However, the reference e represents a base of a natural logarithm in Formula 3. The reference $\gamma_i$ is a parameter depending on propagation of radio waves and is a value that is different according to characteristics of a sea area.

Then, an evaluation function $f_i$ regarding the searching or tracking operation by the unmanned aerial vehicle 20-$i$ can be expressed by a product of the existence probability density of the target and the discovery probability of the target as indicated in Formula 4.

$$f_i=g(x_i,y_i,z_i,x_t,y_t,z_t)p_i(\psi_i) \quad \text{(Formula 4)}$$

However, $(x_i, y_i, z_i)$ in Formula 4 represents coordinates where the unmanned aerial vehicle 20-$i$ is positioned. In this way, as an example of the evaluation functions A(N) and B(N) included in the value calculation criterion 121 according to the present example embodiment, for example, the evaluation function $f_i$ indicated in Formula 4 can be used.

Figure 10:
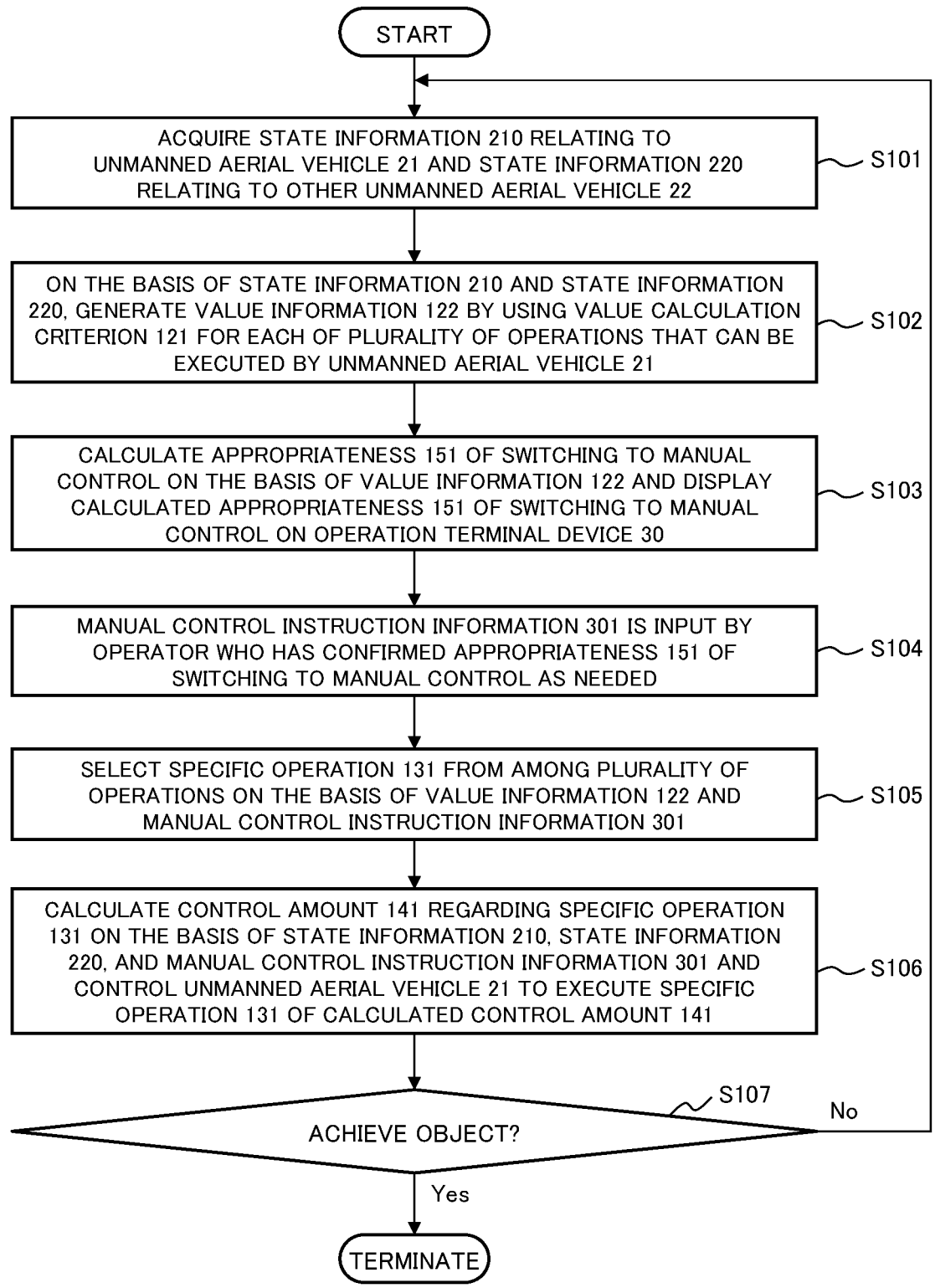
FIG. 10 is a flowchart illustrating an operation of the control device 10 according to the first example embodiment of the present invention.

Next, an operation (processing) of the control device 10 according to the present example embodiment is described in detail with reference to the flowchart in FIG. 10.

The acquisition unit 11 acquires the state information 210 relating to the unmanned aerial vehicle 21 and the state information 220 relating to the other unmanned aerial vehicle 22 (step S101). On the basis of the state information 210 and the state information 220, the generation unit 12 generates the value information 122 by using the value calculation criterion 121 for each of the plurality of operations that can be executed by the unmanned aerial vehicle 21 (step S102).

The calculation unit 15 calculates the appropriateness 151 of the switching to the manual control on the basis of the value information 122 and displays the calculated appropriateness 151 of the switching to the manual control on the operation terminal device 30 (step S103). The manual control instruction information 301 is input to the control device 10 by an operator who has confirmed the appropriateness 151 of the switching to the manual control as needed (step S104).

The selection unit 13 selects the specific operation 131 from among the plurality of operations on the basis of the value information 122 and the manual control instruction information 301 (step S105). The control unit 14 calculates the control amount 141 regarding the specific operation 131 on the basis of the state information 210, the state information 220, and the manual control instruction information 301 and controls the unmanned aerial vehicle 21 to execute the specific operation 131 of the calculated control amount 141 (step S106).

In a case where the plurality of unmanned aerial vehicles 20 does not achieve the given object (No in step S107), the processing returns to step S101. In a case where the plurality of unmanned aerial vehicles 20 achieves the given object (Yes in step S107), the entire processing is terminated.

The control device 10 according to the present example embodiment can control the autonomous operating machine so that each of the plurality of autonomous operating machines that operates in cooperation with each other selects an operation for total optimization in order to achieve the object. This is because the control device 10 generates the value information 122 regarding each of the plurality of operations that can be executed by the unmanned aerial vehicle 21 on the basis of the state information 210 relating the unmanned aerial vehicle 21 and the state information 220 relating to the other unmanned aerial vehicle 22, determines the specific operation 131 from among the plurality of operations on the basis of the generated value information 122, and controls the unmanned aerial vehicle 21 to execute the specific operation 131.

The effects achieved by the control device 10 according to the present example embodiment are described in detail below.

In the modern society in which various application examples using the unmanned aerial vehicles (autonomous operating machine) are proposed, it is desired for the unmanned aerial vehicle to autonomously determine and achieve the object while automatically switching the operations (for example, searching, tracking, capturing, or the like). Then, various application examples that achieve the object by a cooperative operation (cooperation) of the plurality of unmanned aerial vehicles are proposed. In such an application example using the plurality of unmanned aerial vehicles (unmanned aerial vehicle group), switching of the operations of the respective unmanned aerial vehicles are required to match (that is, total optimization), in order to achieve the object from viewpoint as an entire unmanned aerial vehicle group. That is, in order to achieve the object as the unmanned aerial vehicle group, it is necessary for each unmanned aerial vehicle to optimally (efficiently) switch the operations. However, it is significantly difficult to determine the switching of the operations.

To solve such a problem, the control device 10 according to the present example embodiment includes the acquisition unit 11, the generation unit 12, the selection unit 13, and the control unit 14, and operates as described with reference to FIGS. 1 to 10, for example. That is, in a case where the unmanned aerial vehicle 21 (first autonomous operating machine) and the other unmanned aerial vehicle 22 (second autonomous operating machine) that operate in cooperation with each other select and execute at least any one of the plurality of executable operations as needed in order to achieve the object, the acquisition unit 11 acquires the state information 210 indicating an operating state of the unmanned aerial vehicle 21 and the state information 220 indicating an operating state of the other unmanned aerial vehicle 22. On the basis of the state information 210 and the state information 220, the generation unit 12 generates value information 122 indicating a height of a value of the execution of each of the plurality of operations that can be executed by the unmanned aerial vehicle 21 for the achievement of the object by using the value calculation criterion 121. The selection unit 13 selects the specific operation 131 from among the plurality of operations on the basis of the value information 122 regarding each of the plurality of operations. Then, the control unit 14 controls the unmanned aerial vehicle 21 to execute the specific operation 131.

That is, in a case of determining an operation to be executed by the unmanned aerial vehicle 21 next from among the plurality of operations, the control device 10 according to the present example embodiment compares the heights of the values of the execution for the achievement of the given object in a case of the execution by the unmanned aerial vehicle 21 and in a case of the execution by the other unmanned aerial vehicle 22 for each operation, and determines an operation whose comparison result satisfies a criterion as the operation to be executed by the unmanned aerial vehicle 21 next. This makes it possible for the control device 10 to control the autonomous operating machines so that each of the plurality of autonomous operating machines that operates in cooperation with each other selects an operation for total optimization in order to achieve the object.

The value calculation criterion 121 according to the present example embodiment includes the evaluation function expressed by the existence probability density of the target, the discovery probability of the target, and the like, for example, on the basis of the search theory or the like. For example, the evaluation function relating to the searching or tracking operation by the entire unmanned aerial vehicle group including the plurality of unmanned aerial vehicles 20 can be expressed as indicated in Formula 5 by using Formula 4.

$$\Sigma_i f_i \qquad \text{(Formula 5)}$$

Because the control amount (search effort) that can be given to the unmanned aerial vehicle group including the plurality of unmanned aerial vehicles 20 is not unlimited, the maximum value of the control amount is usually a predetermined value. That is, the control device 10 is required to control the unmanned aerial vehicle 20 so that the value indicated by the evaluation function indicated in Formula 5 is maximized under a condition such that the control amount that can be given to the unmanned aerial vehicle group is a predetermined value $\Psi$ as indicated in Formula 6.

$$\Psi = \Sigma_i \psi_i \qquad \text{(Formula 6)}$$

As described regarding the present example embodiment above, the inventor of the present invention has devised a method (algorithm) of selecting the operation to be executed next by the unmanned aerial vehicle 21 and calculating the control amount thereof. That is, the algorithm determines the operation of the unmanned aerial vehicle 21 and the control amount thereof on the basis of the values indicated by the evaluation functions regarding the unmanned aerial vehicle 21 and the other unmanned aerial vehicle 22 so that an increment of the value of the execution for the achievement of the object per unit control amount (unit search effort) becomes the highest.

For example, in a case where a unit control amount relating to a certain operation is input, the algorithm determines to input the unit control amount relating the operation to the unmanned aerial vehicle 21 in a case where the increment of the value of the unmanned aerial vehicle 21 is larger than that of the other unmanned aerial vehicle 22. Conversely, in a case where the increment of the value of the other unmanned aerial vehicle 22 is larger than that of the unmanned aerial vehicle 21, it is determined to input the unit control amount relating to the operation to the other unmanned aerial vehicle 22, instead of the unmanned aerial vehicle 21.

The increment (change amount) of the value per unit control amount is obtained by differentiating the evaluation function by the control amount. Then, in a case where the control amount of the operation is repeatedly calculated so that the increment of the value per unit control amount becomes the highest, the value indicated by the differentiated evaluation function leads to be equal for all the unmanned aerial vehicles 20. Therefore, for example, a method of calculating a control amount that makes the values indicated by the differentiated evaluation functions be equal to each other is effective.

In a case of determining the operation of the unmanned aerial vehicle 21 and the control amount thereof by using the algorithm, the control device 10 does not necessarily need to acquire the state information 220 of all the other unmanned aerial vehicles 22 included in the unmanned aerial vehicle group that operates in order to achieve the object. The control device 10 may determine the operation of the unmanned aerial vehicle 21 and the control amount thereof on the basis of the state information 220 relating to some other unmanned aerial vehicles 22 that are included in the unmanned aerial vehicle group and have a large degree of affecting the unmanned aerial vehicle 21 (for example, other unmanned aerial vehicle 22 close to unmanned aerial vehicle 21, or the like).

The control amount 141 (operation amount) calculated by the control unit 14 according to the present example embodiment is not a scalar amount and is a vector amount having three-dimensional directions. The control unit 14 calculates the control amount 141 expressed as the vector amount, for example, according to the following procedure. That is, the control unit 14 sets the current position of the unmanned aerial vehicle 21 as a start point and generates a vector that connects the start point and the position of the target (position where target is estimated to exist). The control unit 14 generates an operation vector obtained by converting the vector into a unit vector (normalized to vector having length of one). Then, the control unit 14 calculates the operation vector of which the length is the magnitude of the control amount 141 as the control amount 141.

Even in a case where the object given to the plurality of unmanned aerial vehicles 20 is different from searching, adding, and capturing the target, it is sufficient that the control device 10 control the unmanned aerial vehicles 20 as in the present example embodiment. For example, in a case where the object given to the plurality of unmanned aerial vehicles 20 is to improve a communication situation so as not to interrupt the communication between the unmanned aerial vehicles 20, it is assumed that the control device 10 use, for example, the evaluation function indicating the number of the other unmanned aerial vehicles 22 that can communicate with the unmanned aerial vehicle 21 as the evaluation function included in the value calculation criterion 121, and it is sufficient that the evaluation function have the characteristics in which the value increases as the number of the other unmanned aerial vehicles 22 that can communicate with the unmanned aerial vehicle 21 increases. In this case, for example, an evaluation function $h_i$ indicated in Formula 7 is considered.

$$h_i = 1 - e^{-\alpha_i m_i} \quad \text{(Formula 7)}$$

However, the reference mi represents the number of the other unmanned aerial vehicles 22 that can communicate with the unmanned aerial vehicle 20-$i$ (unmanned aerial vehicle 21). The reference $\alpha_i$ represents a predetermined coefficient regarding the unmanned aerial vehicle 20-$i$.

The control device 10 according to the present example embodiment can switch the control system with respect to the unmanned aerial vehicle 21 from the autonomous control system to the manual control system by the operator in response to a request from the operator. In this case, the control device 10 selects the specific operation 131 on the basis of the manual control instruction information 301 input from the operation terminal device 30 and calculates the control amount 141 regarding the specific operation 131.

In recent years, in the application example using the unmanned aerial vehicle for a certain object, there is a concept of Man-in-the-Loop (cooperation between humans and unmanned aerial vehicles) in which the control methods of some unmanned aerial vehicles are switched from the autonomous control system to the manual control system by the operator (intervene manual control to autonomous control) as needed, in addition to that the unmanned aerial vehicle group autonomously operates. Even in such a case, by having the above configuration, the control device 10 according to the present example embodiment can control each of the unmanned aerial vehicles 20 included in the unmanned aerial vehicle group including the unmanned aerial vehicle 20 that is autonomously controlled and the unmanned aerial vehicle 20 that is manually controlled to select an operation for total optimization in order to achieve the object.

The control device 10 according to the present example embodiment calculates the appropriateness 151 of the switching to the manual control, based on the magnitude of the effect on the achievement of the object caused by switching the system of controlling the unmanned aerial vehicle 21 from the autonomous control system to the manual control system, on the basis of the value information 122. Then, the control device 10 displays the calculated appropriateness 151 of the switching to the manual control, for example, on the operation terminal device 30 as illustrated in FIG. 7. This makes it possible for the control device 10 according to the present example embodiment to appropriately and easily select the unmanned aerial vehicle 20 of which the control system is switched to the manual control system in a case where it is necessary to switch the autonomous control system to the manual control system regarding any one of the unmanned aerial vehicles 20 by the operator.

In the present example embodiment described above, it is assumed that the control device 10 be constructed on the cloud side (central management system) in cloud computing. However, the control device 10 may be constructed, for example, as a system on a side of an edge mounted on each unmanned aerial vehicle 20. In this case, it is assumed that the unmanned aerial vehicle 21 have a function capable of directly communicating with the other unmanned aerial vehicle 22. Such a system in which each unmanned aerial vehicle 20 mounts the control device 10 can be constructed even in a case where a region where the unmanned aerial vehicle 20 operates exists in a region where communication with the central management system is difficult. Such a system can continue the operation even in a case where the central management system stops its function due to a failure or the like.

In a case where the control device 10 is constructed as the central management system, for example, the control device 10 may be constructed as a dedicated system in a mother ship that can travel to an area on the sea where the unmanned aerial vehicle 20 performs a searching activity or the like.

The unmanned aerial vehicle 20 may be a UAV, a USV, or a UUV. Alternatively, the unmanned aerial vehicle 20 may be a manned vehicle, in which an operator who monitors an autonomous operation state gets, that can be autonomously controlled. Alternatively, the unmanned aerial vehicle 20 may be a robot fixed on the ground such as a robot that assembles (build) an object in cooperation.

The object given to the unmanned aerial vehicle 20 is not limited to searching for, tracking, and capturing the target. The object given to the unmanned aerial vehicle 20 may be, for example, that the unmanned aerial vehicles 20 equipped with wireless devices form a formation with which information can be transmitted and received at a desired transfer rate to the widest range. That is, the control device 10 according to the present example embodiment can be applied to various application examples in which the plurality of unmanned aerial vehicles 20 that operates in cooperation with each other operates in order to achieve a certain object.

Second Example Embodiment

Figure 11:
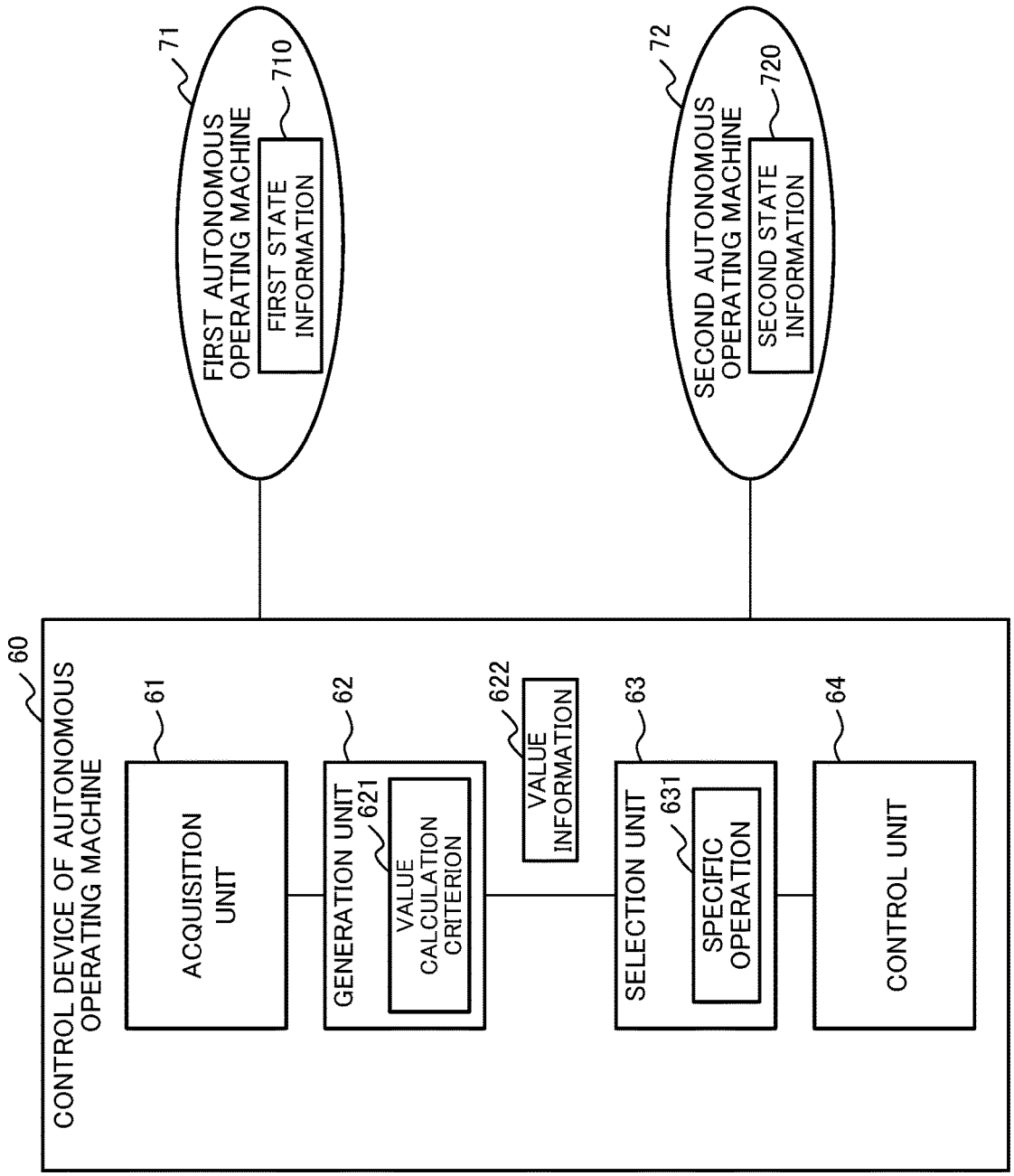
FIG. 11 is a block diagram illustrating a configuration of a control device 60 for an autonomous operating machine according to a second example embodiment of the present invention.

FIG. 11 is a block diagram conceptually illustrating a configuration of a control device 60 for an autonomous operating machine according to a second example embodiment of the present invention. The control device 60 for the autonomous operating machine includes an acquisition unit 61, a generation unit 62, a selection unit 63, and a control unit 64.

In a case where a first autonomous operating machine 71 and a second autonomous operating machine 72 that operate in cooperation with each other select and execute at least any one of a plurality of executable operations as needed in order to achieve an object, the acquisition unit 61 acquires first state information 710 indicating an operating state of the first autonomous operating machine 71 and second state information 720 indicating an operating state of the second autonomous operating machine 72.

On the basis of the first state information 710 and the second state information 720, the generation unit 62 generates value information 622 indicating a height of a value of executing each of the plurality of operations that can be executed by the first autonomous operating machine 71 in order to achieve the object, by using a value calculation criterion 621.

The selection unit 63 selects a specific operation 631 from among the plurality of operations on the basis of the value information 622 regarding each of the plurality of operations.

The control unit 64 controls the first autonomous operating machine 71 to execute the specific operation 631.

The control device 60 for the autonomous operating machine according to the present example embodiment can control the autonomous operating machines so that each of the plurality of autonomous operating machines that operates in cooperation with each other selects an operation for total optimization in order to achieve the object. This is because the control device 60 for the autonomous operating machine generates the value information 622 regarding each of the plurality of operations that can be executed by the first autonomous operating machine 71 on the basis of the first state information 710 relating to the first autonomous operating machine 71 and the second state information 720 relating to the second autonomous operating machine 72, determines the specific operation 631 from among the plurality of operations on the basis of the generated value information 622, and controls the first autonomous operating machine 71 to execute the specific operation 631.

<Exemplary Hardware Configuration>

In each example embodiment described above, each unit of the control device 10 and the control device 60 for the autonomous operating machine illustrated in FIG. 1 and FIG. 11 can be achieved by a dedicated HardWare (HW) (electronic circuit). In FIGS. 1 and 11, at least the following components can be regarded as functional (processing) unit (software module) of a software program.

Acquisition units 11 and 61
Generation units 12 and 62
Selection units 13 and 63
Control units 14 and 64
Calculation unit 15.

However, division of the components illustrated in the figure is the configuration for convenience of explanation, and various configurations may be assumed for implementation. An example of a hardware environment in this case is described with reference to FIG. 12.

Figure 12:
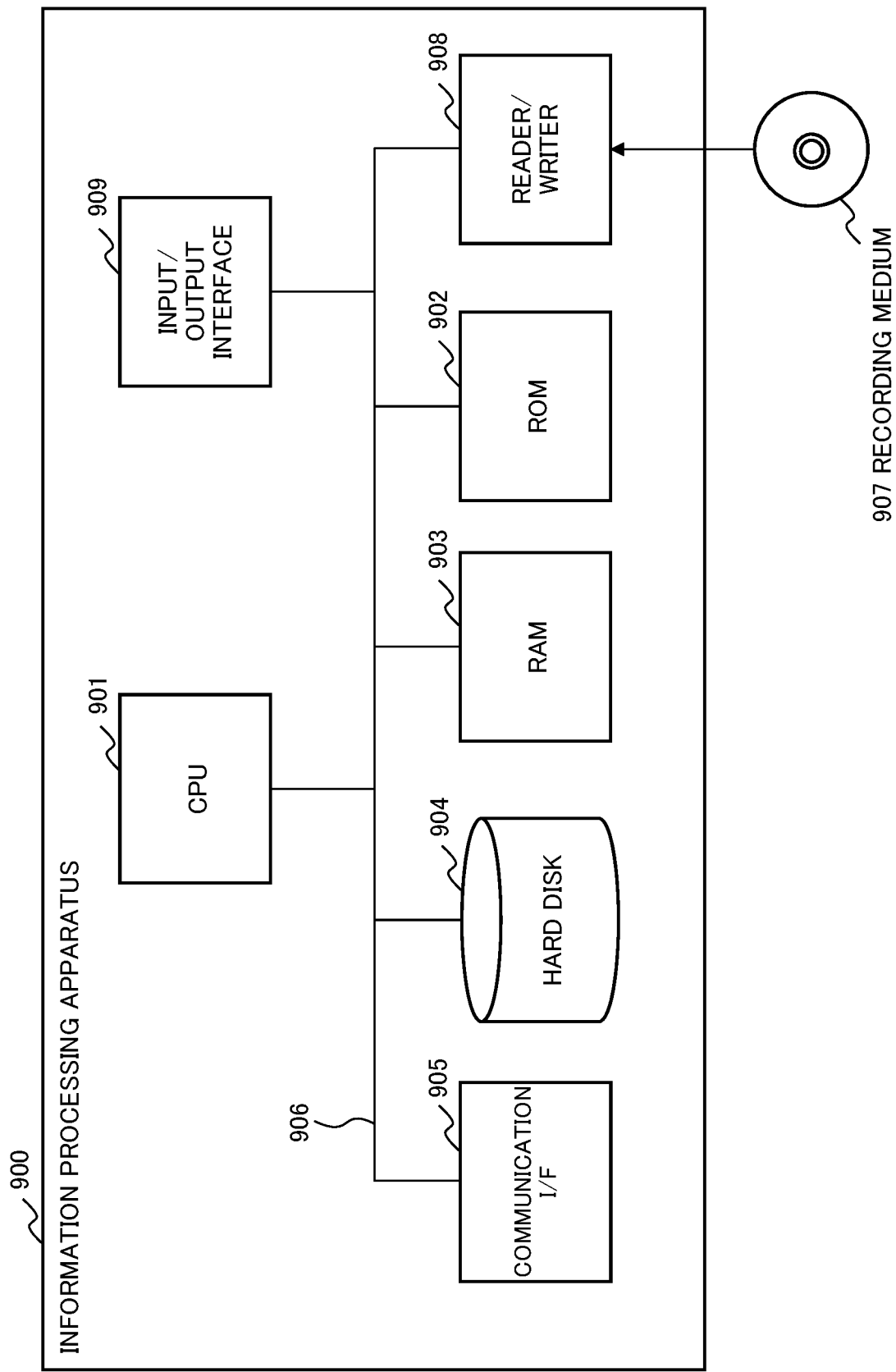
FIG. 12 is a block diagram illustrating a configuration of an information processing apparatus 900 that can execute the control device or the control device for the autonomous operating machine according to each example embodiment of the present invention.

FIG. 12 is a diagram for illustratively explaining a configuration of an information processing apparatus 900 (computer) that can execute the control device or the control device for the autonomous operating machine according to each example embodiment of the present invention. That is, FIG. 12 illustrates a configuration of the computer (information processing apparatus) that can achieve the control device 10 illustrated in FIG. 1 or the control device 60 for the autonomous operating machine illustrated in FIG. 11 and a hardware environment in which each function of the example embodiment can be achieved.

The information processing apparatus 900 illustrated in FIG. 12 includes the following components.

CPU (Central_Processing_Unit) 901,
ROM (Read_Only_Memory) 902,
RAM (Random_Access_Memory) 903,
Hard disk (storage device) 904,
Communication interface 905 with external device,
Bus 906 (communication line),
Reader/writer 908 capable of reading and writing data stored in recording medium 907 such as CD-ROM (Compact_Disc_Read_Only_Memory),
Input/output interface 909 such as monitor, speaker, and keyboard.

That is, the information processing apparatus 900 including the above components is a general computer in which these components are connected via the bus 906. The information processing apparatus 900 may include the plurality of CPUs 901 or may include the CPU 901 including a multi-core.

The present invention that has been described using the example embodiment as an example supplies a computer program that can achieve the following functions to the information processing apparatus 900 illustrated in FIG. 12. The functions are the components in the block diagrams (FIGS. 1 and 11) referred in the description of the example embodiment or the functions in the flowchart (FIG. 10). The present invention is then achieved by reading, interpreting, and executing the computer program on the CPU 901 of the hardware. It is sufficient that the computer program supplied into the apparatus be stored in a readable/writable volatile memory (RAM 903) or a nonvolatile storage device such as the ROM 902, the hard disk 904, or the like.

In the above case, a general procedure at the present can be adopted as a method of supplying the computer program into the hardware. The procedure includes, for example, a method of installing the computer program into the apparatus via various recording media 907 such as a CD-ROM, a method of downloading the computer program from outside via a communication line such as the Internet, or the like. In such a case, the present invention can be regarded to include codes included in the computer program or the recording medium 907 that stores the codes.

The present invention has been described above using the example embodiments as a model example. However, the present invention is not limited to the example embodiments described above. That is, it will be understood by those of ordinary skill in the art that various modes may be applied therein without departing from the spirit and scope of the present invention as defined by the claims.

A part or all of each example embodiment may be described as in the following supplemental notes. However, the present invention that has been illustratively described according to each example embodiment is not limited to the following.

(Supplementary Note 1)

A control device for an autonomous operating machine including:

acquisition means for acquiring first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object;

generation means for generating value information indicating a height of a value of execution for achievement of the object regarding each of the plurality of operations that can be executed by the first autonomous operating machine by using a value calculation criterion based on the first state information and the second state information;

selection means for selecting a specific operation from among the plurality of operations based on the value information regarding each of the plurality of operations; and control means for controlling the first autonomous operating machine to execute the specific operation.

(Supplementary Note 2)

The control device for the autonomous operating machine according to supplementary note 1, in which the control means calculates a control amount regarding the specific operation based on the first state information and the second state information and controls the first autonomous operating machine to execute the specific operation of the control amount being calculated.

(Supplementary Note 3)

The control device for the autonomous operating machine according to supplementary note 2, in which the selection means selects the specific operation based on manual control instruction information, the manual control instruction information being input from outside and instructing manual control to the first autonomous operating machine, and the control means calculates the control amount regarding the specific operation based on the manual control instruction information.

(Supplementary Note 4)

The control device for the autonomous operating machine according to supplementary note 3, in which at least one of the generation means or the selection means performs calculation for preventing or recommending execution of the operation with respect to a value indicated by the value information regarding each of the plurality of operations based on the manual control instruction information.

(Supplementary Note 5)

The control device for the autonomous operating machine according to supplementary note 3 or 4, further including:

calculation means for calculating an appropriateness of switching to a manual control system based on a magnitude of an effect on the achievement of the object caused by switching a system of controlling the first autonomous operating machine from an autonomous control system to the manual control system, based on the value information.

(Supplementary Note 6)

The control device of the autonomous operating machine according to supplementary note 5, in which the calculation means calculates the appropriateness in such a way that a value indicated by the appropriateness increases as the value indicated by the value information is smaller.

(Supplementary Note 7)

The control device for the autonomous operating machine according to supplementary note 5 or 6, in which the calculation means displays the appropriateness being calculated, in association with the first autonomous operating machine, on a display screen included in an operation terminal device to which the manual control instruction information is input through an operation.

(Supplementary Note 8)

The control device of the autonomous operating machine according to any one of supplementary notes 2 to 7, in which the generation means uses a first evaluation function and a second evaluation function, for each of the plurality of operations, as the value calculation criterion, the first evaluation function indicating a relationship between the control amount required for the execution of the operation by the first autonomous operating machine and the height of the value, based on the first state information, the second evaluation function indicating a relationship between the control amount required for the execution of the operation by the second autonomous operating machine and the height of the value, based on the second state information.

(Supplementary Note 9)

The control device for the autonomous operating machine according to supplementary note 8, in which the generation means calculates a difference between the first evaluation function and the second evaluation function or a difference between a value obtained by differentiating the first evaluation function by the control amount and a value obtained by differentiating the second evaluation function by the control amount.

(Supplementary Note 10)

The control device for the autonomous operating machine according to supplementary note 8 or 9, in which in a case where the operation is searching for or tracking a target, the first evaluation function and the second evaluation function are expressed by a function indicating an existence probability density of the target based on a positional relationship between the first autonomous operating machine and the target and a function indicating a discovery probability of the target based on the control amount.

(Supplementary Note 11)

The control device of the autonomous operating machine according to supplementary note 10, in which the function indicating the existence probability density, in a case where the operation is searching for the target, has characteristics that a value is maximized at a center of a partial region for each of a plurality of the partial regions included in a region where the first and second autonomous operating machines search for the target and decreases as approaching to a boundary of the partial region and in a case where the operation is tracking the target, has characteristics that the value is maximized at a position where the target has been found most recently and decreases as separating from the position where the target has been found most recently.

(Supplementary Note 12)

The control device for the autonomous operating machine according to any one of supplementary notes 2 to 7, in which the control means calculates the control amount regarding the specific operation, for each of the plurality of operations, by using a first evaluation function and a second evaluation function, the first evaluation function indicating a relationship between the control amount required for the execution of the operation by the first autonomous operating machine and the height of the value, based on the first state information, the second evaluation function indicating a relationship between the control amount required for the execution of the operation by the second autonomous operating machine and the height of the value, based on the second state information.

(Supplementary Note 13)

The control device for the autonomous operating machine according to supplementary note 12, in which the control means calculates the control amount regarding the specific operation, the control amount making a value obtained by differentiating the first evaluation function by the control amount and a value obtained by differentiating the second evaluation function by the control amount be equal to each other.

(Supplementary Note 14)

The control device for the autonomous operating machine according to any one of supplementary notes 1 to 13, in which the acquisition means, the generation means, the selection means, and the control means are included in the first autonomous operating machine or an information processing apparatus that can communicate with the first autonomous operating machine.

(Supplementary Note 15)

A control method for an autonomous operating machine performed by an information processing apparatus, including:

acquiring first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object;

generating value information indicating a height of a value of execution for achievement of the object regarding each of the plurality of operations that can be executed by the first autonomous operating machine by using a value calculation criterion based on the first state information and the second state information;

selecting a specific operation from among the plurality of operations based on the value information regarding each of the plurality of operations; and controlling the first autonomous operating machine to execute the specific operation.

(Supplementary Note 16)

A recording medium for storing a control program for an autonomous operating machine for causing a computer to execute processing including:

acquisition processing of acquiring first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object;

generation processing of generating value information indicating a height of a value of execution for achievement of the object regarding each of the plurality of operations that can be executed by the first autonomous operating machine by using a value calculation criterion based on the first state information and the second state information;

selection processing of selecting a specific operation from among the plurality of operations based on the value information regarding each of the plurality of operations; and control processing of controlling the first autonomous operating machine to execute the specific operation.

REFERENCE SIGNS LIST 10 control device
11 acquisition unit
12 generation unit
121 value calculation criterion
122 value information
13 selection unit
131 specific operation
14 control unit
141 control amount
15 calculation unit
151 appropriateness of switching to manual control
20 unmanned aerial vehicle
21 unmanned aerial vehicle
210 state information
22 other unmanned aerial vehicle
220 state information
30 operation terminal device
301 manual control instruction information
31 unmanned aerial vehicle status display unit
32 appropriateness display unit
33 manual operation unit
40 wireless communication device
50 communication network
60 control device for autonomous operating machine
61 acquisition unit
62 generation unit
621 value calculation criterion
622 value information
63 selection unit
631 specific operation
64 control unit
71 first autonomous operating machine
710 first state information
72 second autonomous operating machine
720 second state information
900 information processing apparatus
901 CPU
902 ROM
903 RAM
904 hard disk (storage device)
905 communication interface 906 bus
907 recording medium
908 reader/writer
909 input/output interface

What is claimed is:

1. A control device for an autonomous operating machine comprising:
   at least one memory storing a computer program; and
   at least one processor configured to execute the computer program to acquire first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object;
   generate value information indicating a height of a value of execution for achievement of the object regarding each of the plurality of operations that can be executed by the first autonomous operating machine by using a value calculation criterion based on the first state information and the second state information;
   select a specific operation from among the plurality of operations based on the value information regarding each of the plurality of operations; and
   control the first autonomous operating machine to execute the specific operation.

2. The control device for an autonomous operating machine according to claim 1, wherein the processor is configured to execute the computer program to
   calculate a control amount regarding the specific operation based on the first state information and the second state information information; and
   control the first autonomous operating machine to execute the specific operation of the control amount being calculated.

3. The control device for an autonomous operating machine according to claim 2, wherein the processor is configured to execute the computer program to
   select the specific operation based on manual control instruction information, the manual control instruction information being input from outside and instructing manual control to the first autonomous operating machine; and
   calculate the control amount regarding the specific operation based on the manual control instruction information.

4. The control device for an autonomous operating machine according to claim 3, wherein the processor is configured to execute the computer program to
   perform calculation for preventing or recommending execution of the operation with respect to a value indicated by the value information regarding each of the plurality of operations based on the manual control instruction information.

5. The control device for an autonomous operating machine according to claim 3, wherein the processor is configured to execute the computer program to
   calculate an appropriateness of switching to a manual control system based on a magnitude of an effect on the achievement of the object caused by switching a system of controlling the first autonomous operating machine from an autonomous control system to the manual control system, based on the value information.

6. The control device for an autonomous operating machine according to claim 5, wherein the processor is configured to execute the computer program to
   calculate the appropriateness in such a way that a value indicated by the appropriateness increases as the value indicated by the value information is smaller.

7. The control device for an autonomous operating machine according to claim 5, wherein the processor is configured to execute the computer program to
   display the appropriateness being calculated, in association with the first autonomous operating machine, on a display screen included in an operation terminal device to which the manual control instruction information is input through an operation.

8. The control device for an autonomous operating machine according to claim 2, wherein the processor is configured to execute the computer program to
   use a first evaluation function and a second evaluation function, for each of the plurality of operations, as the value calculation criterion, the first evaluation function indicating a relationship between the control amount required for the execution of the operation by the first autonomous operating machine and the height of the value, based on the first state information, the second evaluation function indicating a relationship between the control amount required for the execution of the operation by the second autonomous operating machine and the height of the value, based on the second state information.

9. The control device for an autonomous operating machine according to claim 8, wherein the processor is configured to execute the computer program to
   calculate a difference between the first evaluation function and the second evaluation function or a difference between a value obtained by differentiating the first evaluation function by the control amount and a value obtained by differentiating the second evaluation function by the control amount.

10. The control device for an autonomous operating machine according to claim 8, wherein
    in a case where the operation is searching for or tracking a target, the first evaluation function and the second evaluation function are expressed by a function indicating an existence probability density of the target based on a positional relationship between the first autonomous operating machine and the target and a function indicating a discovery probability of the target based on the control amount.

11. The control device for an autonomous operating machine according to claim 10, wherein
    the function indicating the existence probability density,
       in a case where the operation is searching for the target, has characteristics that a value is maximized at a center of a partial region for each of a plurality of the partial regions included in a region where the first and second autonomous operating machines search for the target and decreases as approaching to a boundary of the partial region, and
       in a case where the operation is tracking the target, has characteristics that the value is maximized at a position where the target has been found most recently and decreases as separating from the position where the target has been found most recently.

12. The control device for an autonomous operating machine according to claim 2, wherein the processor is configured to execute the computer program to calculate the control amount regarding the specific operation, for each of the plurality of operations, by using a first evaluation function and a second evaluation function, the first evaluation function indicating a relationship between the control amount required for the execution of the operation by the first autonomous operating machine and the height of the value, based on the first state information, the second evaluation function indicating a relationship between the control amount required for the execution of the operation by the second autonomous operating machine and the height of the value, based on the second state information.

13. The control device for an autonomous operating machine according to claim 12, wherein the processor is configured to execute the computer program to calculate the control amount regarding the specific operation, the control amount making a value obtained by differentiating the first evaluation function by the control amount and a value obtained by differentiating the second evaluation function by the control amount be equal to each other.

14. The control device for an autonomous operating machine according to claim 1, wherein the memory and the processor are included in the first autonomous operating machine or an information processing apparatus that can communicate with the first autonomous operating machine.

15. A control method for an autonomous operating machine performed by an information processing apparatus, comprising:

acquiring first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object;

generating value information indicating a height of a value of execution for achievement of the object regarding each of the plurality of operations that can be executed by the first autonomous operating machine by using a value calculation criterion based on the first state information and the second state information;

selecting a specific operation from among the plurality of operations based on the value information regarding each of the plurality of operations; and controlling the first autonomous operating machine to execute the specific operation.

16. A non-transitory computer-readable recording medium for storing a control program for an autonomous operating machine for causing a computer to execute processing comprising:

acquisition processing of acquiring first state information indicating an operating state of a first autonomous operating machine and second state information indicating an operating state of a second autonomous operating machine in a case where the first and the second autonomous operating machines that operate in cooperation with each other select and execute at least any one of a plurality of executable operations as needed in order to achieve an object;

generation processing of generating value information indicating a height of a value of execution for achievement of the object regarding each of the plurality of operations that can be executed by the first autonomous operating machine by using a value calculation criterion based on the first state information and the second state information;

selection processing of selecting a specific operation from among the plurality of operations based on the value information regarding each of the plurality of operations; and control processing of controlling the first autonomous operating machine to execute the specific operation.

* * * * *